US010019617B2

(12) United States Patent
Suzuki

(10) Patent No.: US 10,019,617 B2
(45) Date of Patent: Jul. 10, 2018

(54) BIOMETRICS AUTHENTICATION DEVICE AND BIOMETRICS AUTHENTICATION METHOD

(71) Applicant: FUJITSU FRONTECH LIMITED, Tokyo (JP)

(72) Inventor: Tomoharu Suzuki, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 15/266,012

(22) Filed: Sep. 15, 2016

(65) Prior Publication Data

US 2017/0004349 A1 Jan. 5, 2017

Related U.S. Application Data

(63) Continuation of application No. PCT/JP2014/058385, filed on Mar. 25, 2014.

(51) Int. Cl.
*G06K 9/00* (2006.01)
*G06F 21/32* (2013.01)

(52) U.S. Cl.
CPC ......... *G06K 9/00067* (2013.01); *G06F 21/32* (2013.01); *G06K 9/001* (2013.01);
(Continued)

(58) Field of Classification Search
USPC ........ 1/1; 340/5.53, 5.83; 348/118; 382/100, 382/115, 118, 124, 125, 151, 168, 199,
(Continued)

(56) References Cited

U.S. PATENT DOCUMENTS

| | | | |
|---|---|---|---|
| 6,282,304 B1 * | 8/2001 | Novikov | G06F 3/03543 340/5.83 |
| 6,876,757 B2 * | 4/2005 | Yau | G06K 9/00067 340/5.83 |

(Continued)

FOREIGN PATENT DOCUMENTS

| | | |
|---|---|---|
| JP | 2000-358025 | 12/2000 |
| JP | 2006-500662 A | 1/2006 |

(Continued)

OTHER PUBLICATIONS

Int'l. Search Report issued in Int'l. App. No. PCT/JP2014/058385, dated May 13, 2014.

(Continued)

*Primary Examiner* — Xuemei Chen
(74) *Attorney, Agent, or Firm* — Greer Burns & Crain, Ltd.

(57) ABSTRACT

A biometrics authentication device is configured to include a non-directional feature generation process unit configured to generate a non-directional feature on the basis of a directional features; a directional feature generation process unit configured to select, from among the directional features, a reference directional feature corresponding to a reference direction; a non-directional feature matching process unit configured to obtain a first degree of similarity between the non-directional feature and a registered non-directional feature; a directional feature matching process unit configured to obtain a second degree of similarity between the reference directional feature and a registered reference directional feature; and a determination unit configured to make a weight of the second degree of similarity smaller than a weight of the first degree of similarity and to determine whether or not a subject is a person to be
(Continued)

authenticated, by using the first degree of similarity and the second degree of similarity.

17 Claims, 25 Drawing Sheets

(52) U.S. Cl.
CPC ....... *G06K 9/0008* (2013.01); *G06K 9/00087* (2013.01); *G06K 2009/00932* (2013.01)

(58) Field of Classification Search
USPC ................ 382/204, 209, 261; 600/437, 443; 726/19
See application file for complete search history.

(56) References Cited

U.S. PATENT DOCUMENTS

| | | | | |
|---|---|---|---|---|
| 7,072,525 B1* | 7/2006 | Covell | ..................... | G06T 5/50 382/261 |
| 7,359,555 B2* | 4/2008 | Porikli | ................ | G03B 15/006 382/204 |
| 7,496,214 B2* | 2/2009 | Zhang | ................ | G06K 9/00067 340/5.53 |
| 7,636,455 B2* | 12/2009 | Keaton | ................ | G06K 9/0063 348/118 |
| 7,903,880 B2* | 3/2011 | Wyatt | .................. | G06K 9/4609 382/199 |
| 8,077,932 B2* | 12/2011 | Togashi | ............... | G06K 9/4619 382/100 |
| 8,285,010 B2* | 10/2012 | Rowe | ................... | A61B 5/0059 382/115 |
| 8,358,870 B2* | 1/2013 | Abiko | ................ | G06K 9/00026 382/107 |
| 8,712,114 B2* | 4/2014 | Thaniyath | ............... | G06T 5/002 382/124 |
| 8,953,854 B2* | 2/2015 | Kumar | ............... | G06K 9/00087 382/124 |
| 9,280,805 B2* | 3/2016 | Esaki | ..................... | G06T 5/001 |
| 9,317,761 B2* | 4/2016 | Kong | ................ | G06K 9/00885 |
| 2004/0042645 A1* | 3/2004 | Wang | ................ | G06K 9/00067 382/125 |
| 2004/0057606 A1 | 3/2004 | David et al. | | |
| 2005/0084155 A1 | 4/2005 | Yumoto et al. | | |
| 2005/0281438 A1 | 12/2005 | Zhang et al. | | |
| 2006/0020203 A1* | 1/2006 | Tamura | ..................... | G06T 5/20 600/437 |
| 2006/0126916 A1* | 6/2006 | Kokumai | .............. | G03F 9/7076 382/151 |
| 2006/0147096 A1* | 7/2006 | Lee | .................... | G06K 9/00067 382/124 |
| 2007/0036400 A1* | 2/2007 | Watanabe | ............... | G06K 9/001 382/124 |
| 2007/0217660 A1 | 9/2007 | Komura et al. | | |
| 2008/0298642 A1 | 12/2008 | Meenen | | |
| 2009/0185746 A1* | 7/2009 | Mian | .................. | G06K 9/00201 382/209 |
| 2009/0245593 A1 | 10/2009 | Suzuki et al. | | |
| 2009/0245648 A1 | 10/2009 | Hara | | |
| 2009/0268951 A1 | 10/2009 | Zhang et al. | | |
| 2011/0200237 A1* | 8/2011 | Nakamura | ........... | A61B 5/1171 382/127 |
| 2012/0108973 A1* | 5/2012 | Osumi | ..................... | A61B 8/06 600/443 |
| 2012/0194662 A1 | 8/2012 | Zhang et al. | | |
| 2012/0201431 A1 | 8/2012 | Komura et al. | | |
| 2013/0004028 A1* | 1/2013 | Jones | ................ | G06K 9/00228 382/118 |
| 2013/0136327 A1 | 5/2013 | Kamei | | |
| 2013/0251213 A1 | 9/2013 | Nada et al. | | |
| 2014/0133711 A1* | 5/2014 | Abe | ....................... | G06K 9/036 382/115 |
| 2014/0294251 A1 | 10/2014 | Jo et al. | | |
| 2015/0020181 A1 | 1/2015 | Iwata | | |
| 2015/0071538 A1* | 3/2015 | Marchisio | ............ | G06K 9/4647 382/168 |
| 2015/0261299 A1* | 9/2015 | Wajs | ........................ | G06F 3/011 726/19 |
| 2015/0356362 A1* | 12/2015 | Demos | ............... | G06K 9/00885 382/115 |
| 2017/0193637 A1* | 7/2017 | Suzuki | ................. | A61B 5/1171 |

FOREIGN PATENT DOCUMENTS

| | | |
|---|---|---|
| JP | 2006-301881 | 11/2006 |
| JP | 2007-249339 | 9/2007 |
| JP | 2009-237621 A | 10/2009 |
| JP | 2009-301104 | 12/2009 |
| JP | 2012-73684 | 4/2012 |
| WO | WO 2011/052085 A1 | 5/2011 |
| WO | WO 2012/020718 A1 | 2/2012 |
| WO | WO 2013/136553 A1 | 9/2013 |

OTHER PUBLICATIONS

A. Ross et al.; "A hybrid fingerprint matcher"; Pattern Recognition, vol. 36, No. 7, pp. 1661-1673; 2003.
Int'l. Search Report issued in Int'l. App. No. PCT/JP2014/058383, dated May 13, 2014.
Int'l. Search Report issued in Int'l. App. No. PCT/JP2014/058384, dated May 13, 2014.
Int'l. Search Report issued in Int'l. App, No. PCT/JP2015/059213, dated Jun. 16, 2015.
Written Opinion (PCT/ISA/237) dated Jun. 16, 2015 (with partial translation).
U.S. Appl. No. 15/265,189, filed Sep. 14, 2016.
U.S. Appl. No. 15/236,990, filed Aug. 15, 2016.
U.S. Appl. No. 15/266,067, filed Sep. 15, 2016.
Hany F. Arid et al., "Optimally Rotation-Equivariant Directional Derivative Kernels?", Sep. 10, 1997.
Keiji Yamada et al., "Consideration on Stability of Gabor Feature Extraction and Character Recognition Application", vol. 92, No. 433; Jan. 21, 1993 (with partial English translation).
Kijja Srimuang et al. "Detection of a Person Face and Head Pose Estimation using the Gabor wavelet.", vol. 2004, No. 119; (with partial English translation).
Kazuhiro Hotta et al., "Object Detection Method Based on Maximun Cliques", vol. 2002, No. 114, p. 49-56; Nov. 29, 2002 (with partial English translation).
Hiroshi Yoshimura et al, "Efficacy Evaluation of Directional Edge Component Projection Method for Caption Recognition", vol. 99, No. 649, p. 17-22; Feb. 22, 2000 (with partial English translation).
Jialiang Peng et al., "Finger-vein Verification Using Gabor Filter and SIFT Feature Matching" p. 45-48; Jul. 18, 2012.
Yang Wenming et al.; "Comparative competitive coding for personal identification by using finger vein and finger dorsal texture fusion" Information Sciences, vol. 268, p. 20-32; Oct. 21, 2013.
ESSR issued in corresponding EP patent application No. 14887606. 3, dated Jan. 20, 2017.
Office action issued in corresponding Japanese patent application No. 2016-509684, dated Dec. 20, 2016 (with full machine translation).
Office action issued in corresponding Japanese patent application No. 2016-509683, dated Dec. 20, 2016 (with full machine translation).
ESSR issued in corresponding EP patent application No. 14887446. 4, dated Feb. 9, 2017.
Chaudhuri S. et al.; Detection of Blood Vessels in Retinal Images Using Two-Dimensional Matched Filters, IEEE Service Center, vol. 8, No. 3, Sep. 1, 1989.
Al Bovik "Handbook of Image and Video Processing (First Edition)"; May 31, 2001.
Office action issued in U.S. Appl. No. 15/236,990, dated Aug. 10, 2017.
Extended EP Search Report issued in European patent application No. 14886867.2, dated Apr. 20, 2017.

(56) References Cited

OTHER PUBLICATIONS

Office Action issued in corresponding Japanese patent application No. 2014-062775, dated May 2, 2017 (full machine translation).
Wei Li et al., "Principal Line-Based Alignment Refinement for Palm Print Recognition.", vol. 42, No. 6, pp. 1491-1499; Nov. 1, 2012.
Zhen-Hua Guo et al., "Palmprint recognition using Gabor magnitude code", pp. 796-801; Jul. 11, 2010.
Kumar A. et al., "Personal authentication using multiple palm print representation", vol. 38, No. 10, pp. 1695-1704; Oct. 1, 2005.
Office action issued in U.S. Appl. No. 15/265,189, dated Oct. 13, 2017.
Office action issued in corresponding U.S. Appl. No. 15/266,067, dated Feb. 27, 2018.
Office action issued in corresponding EP App. No. 14 887 606.3, dated Mar. 15, 2018.

\* cited by examiner

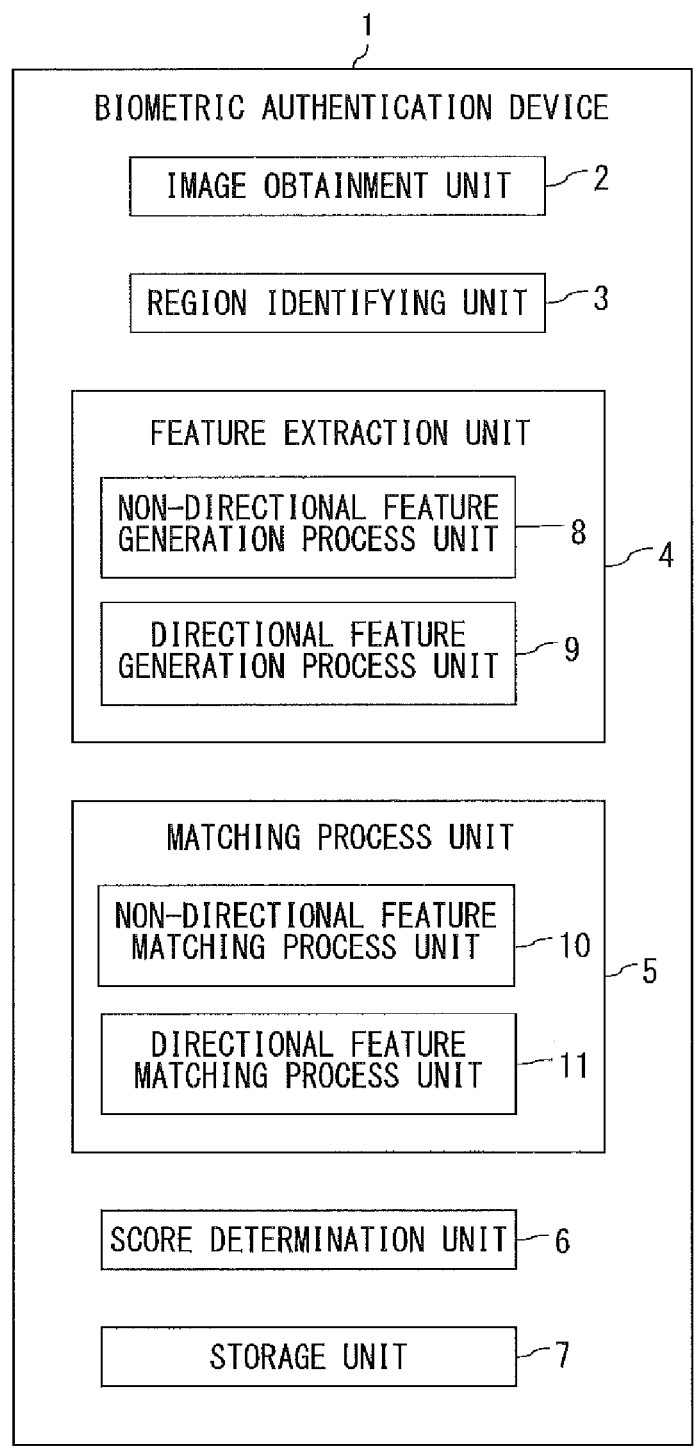
F I G. 1

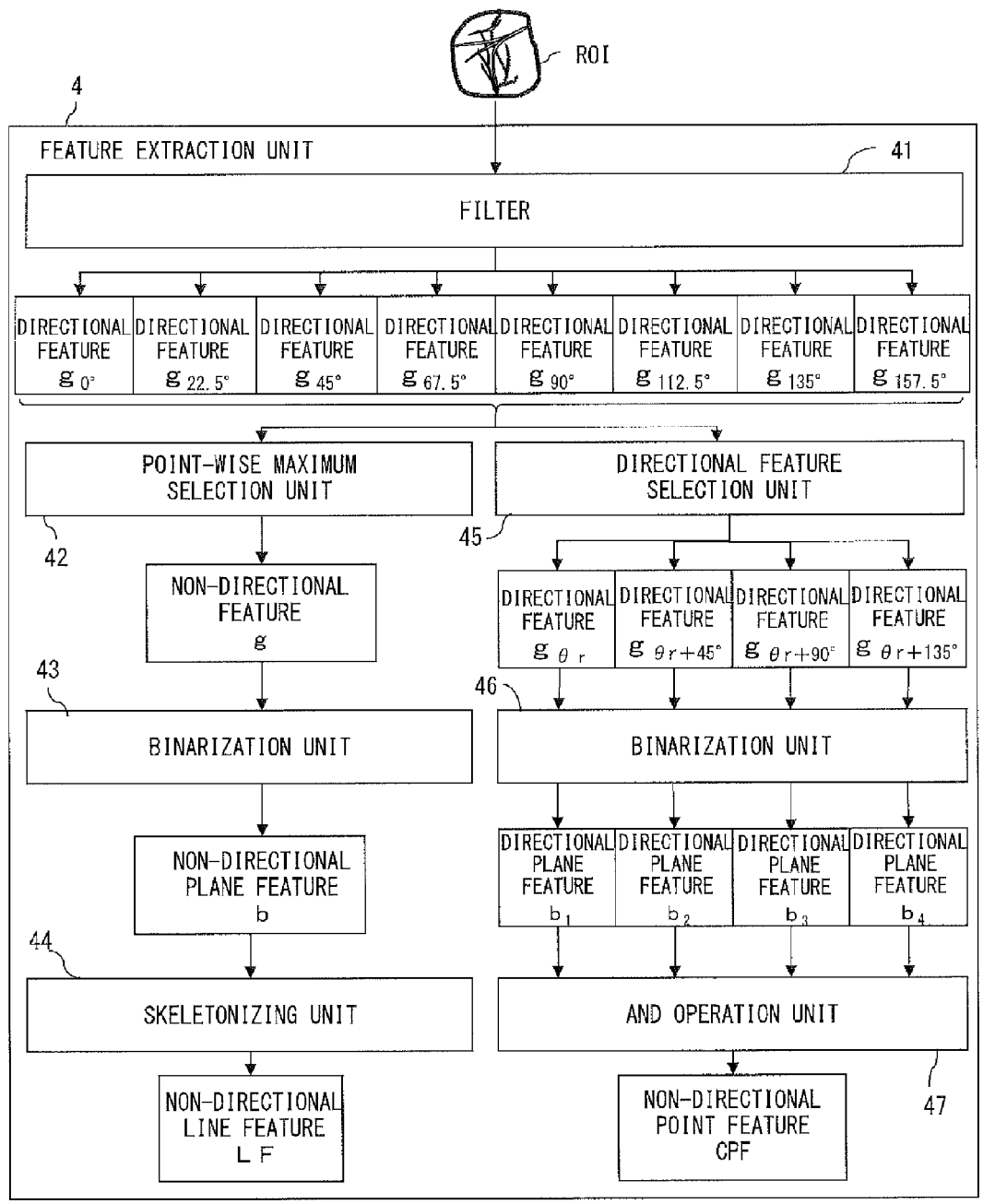
F I G. 3

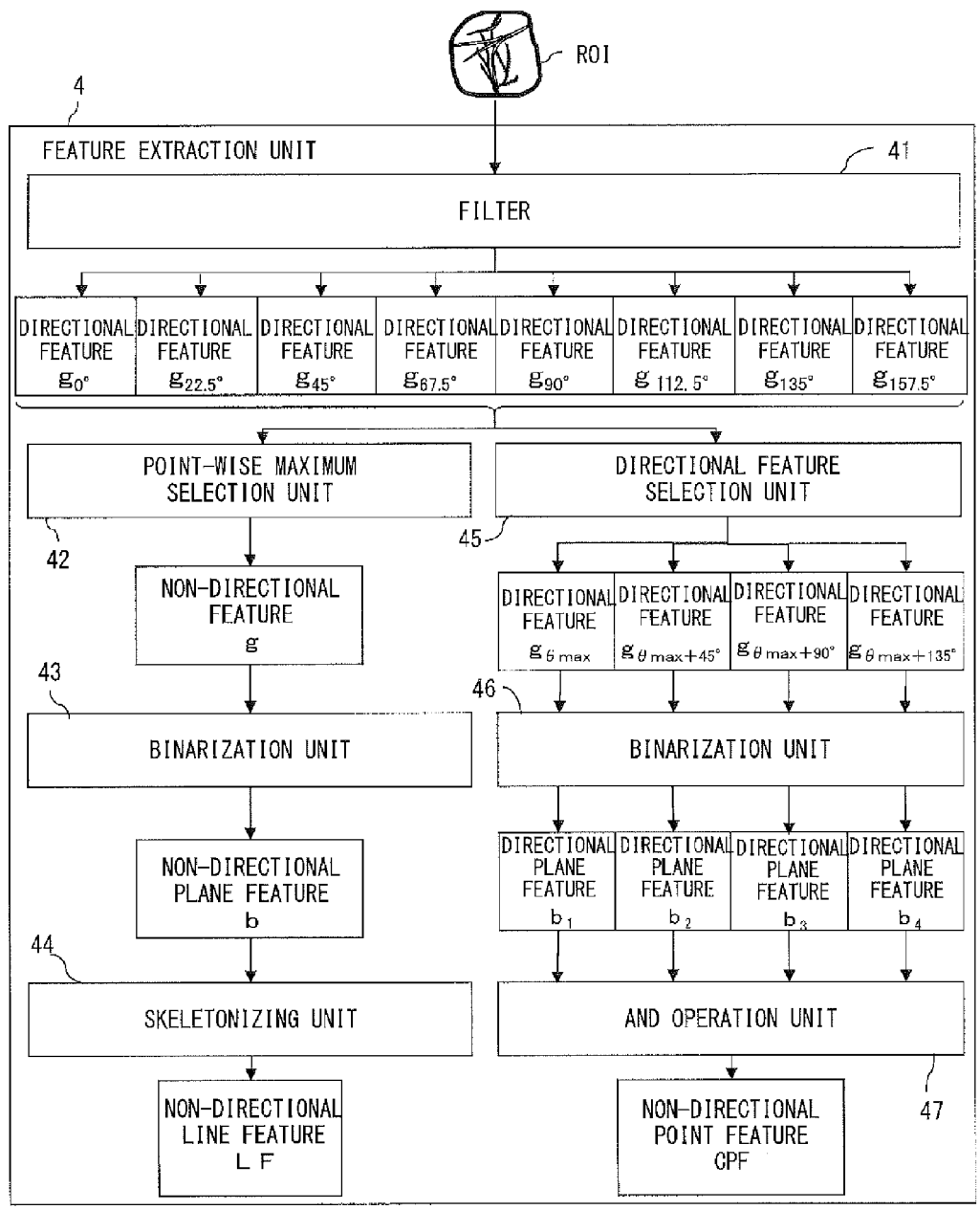
F I G. 6

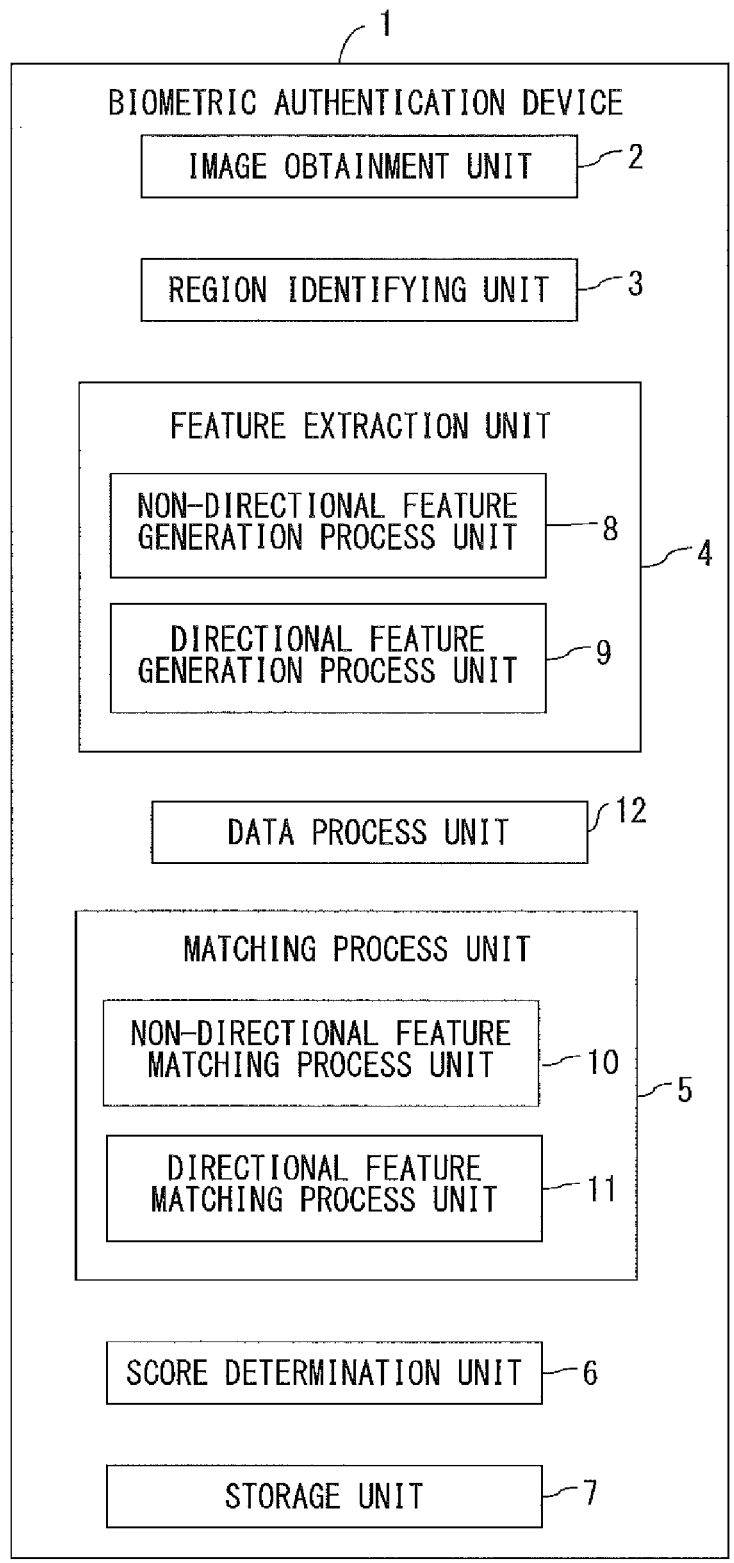
F I G. 9

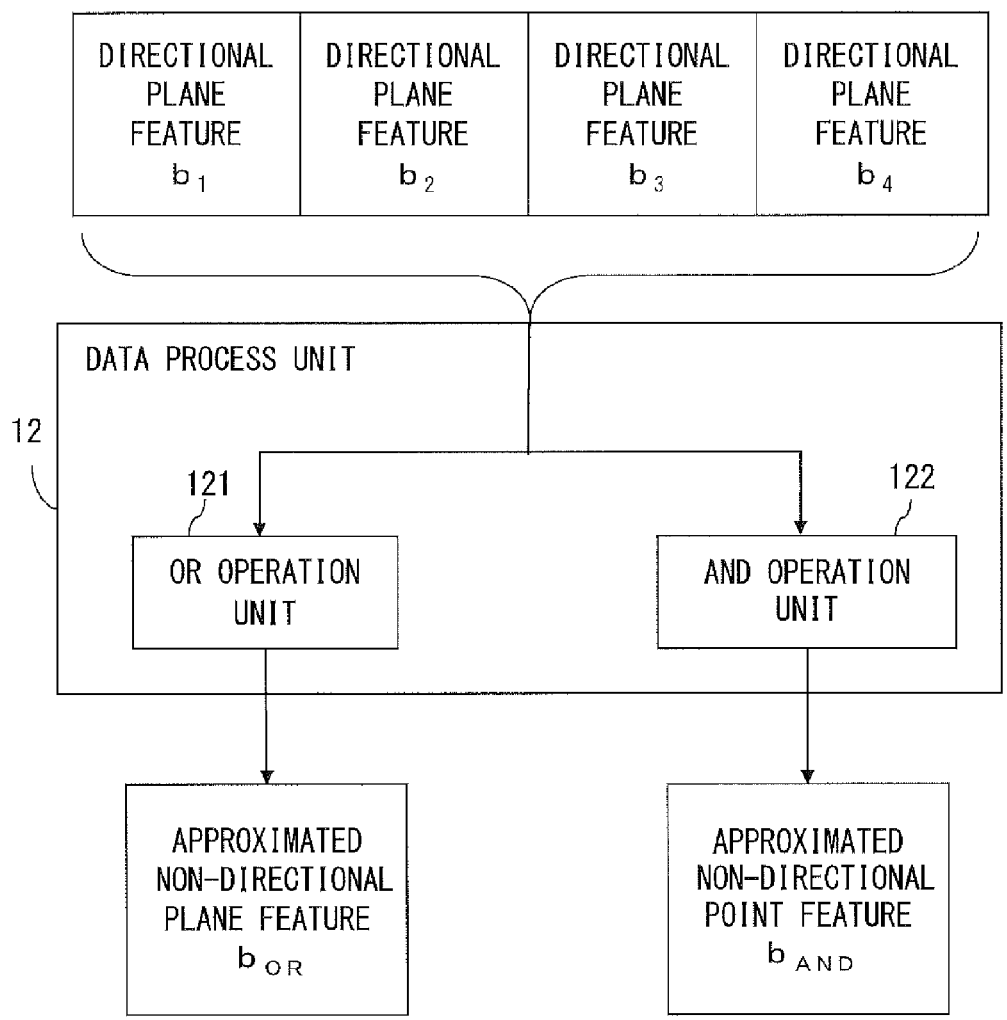
F I G. 1 0

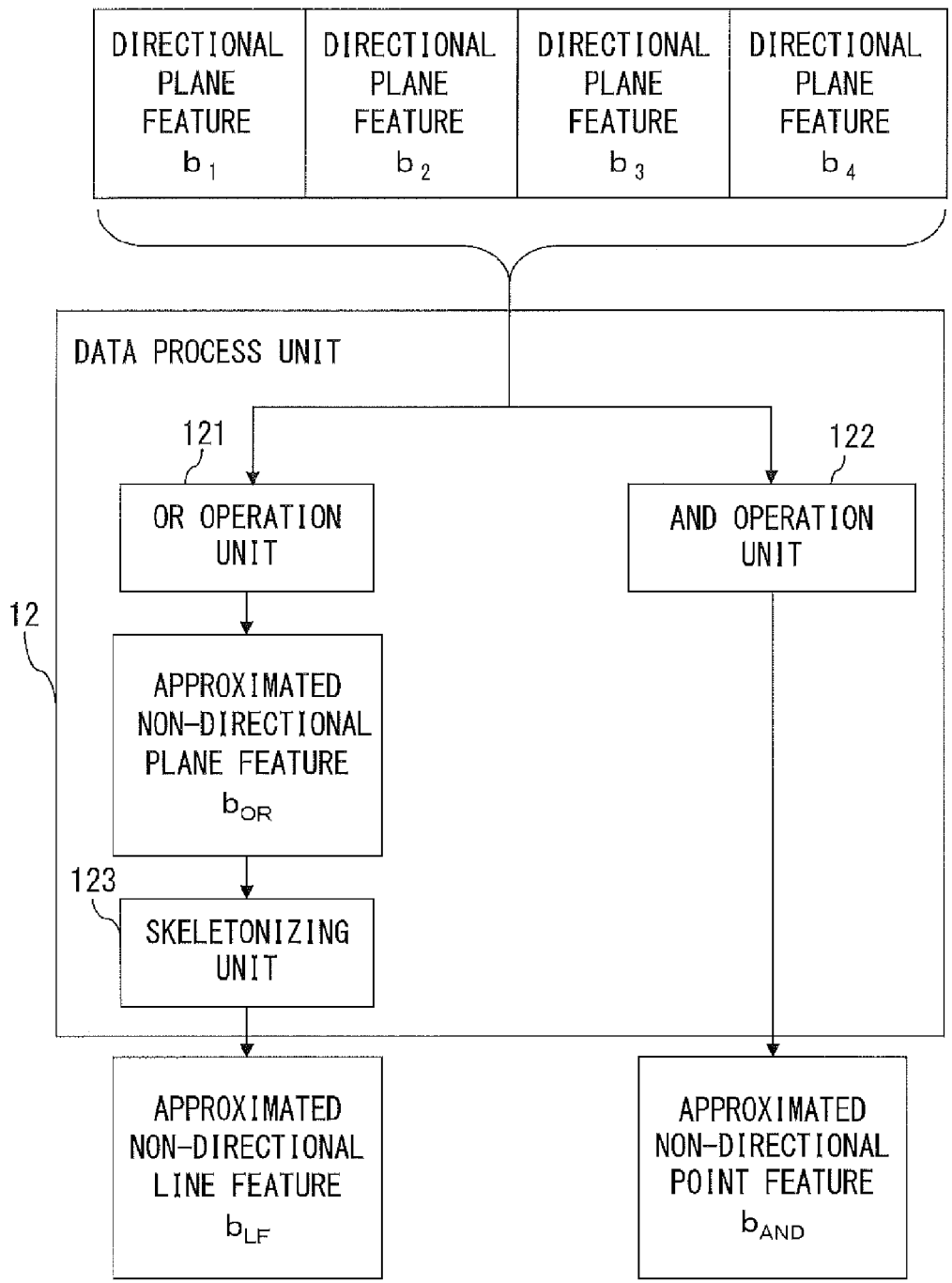
F I G. 1 1

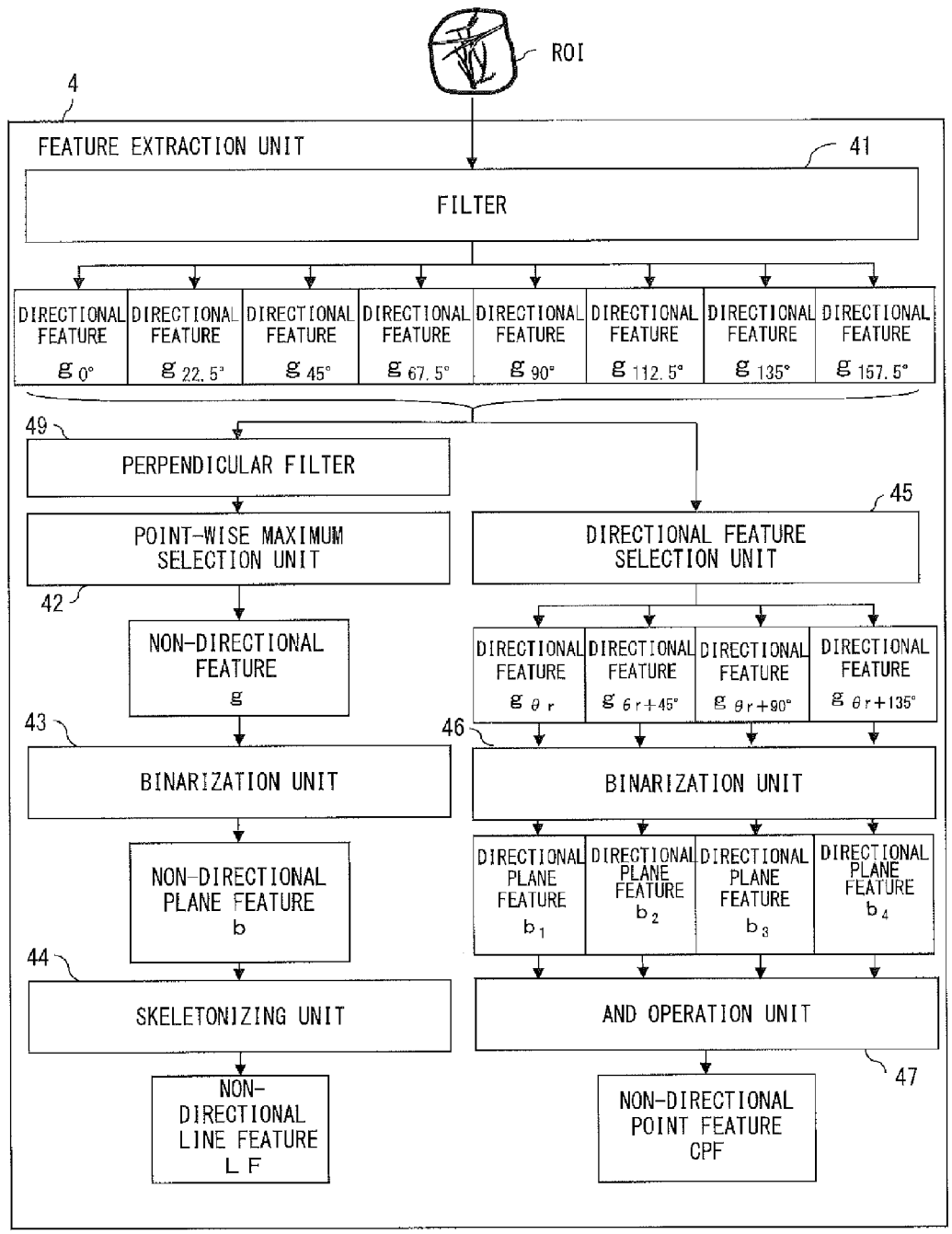
F I G. 1 6

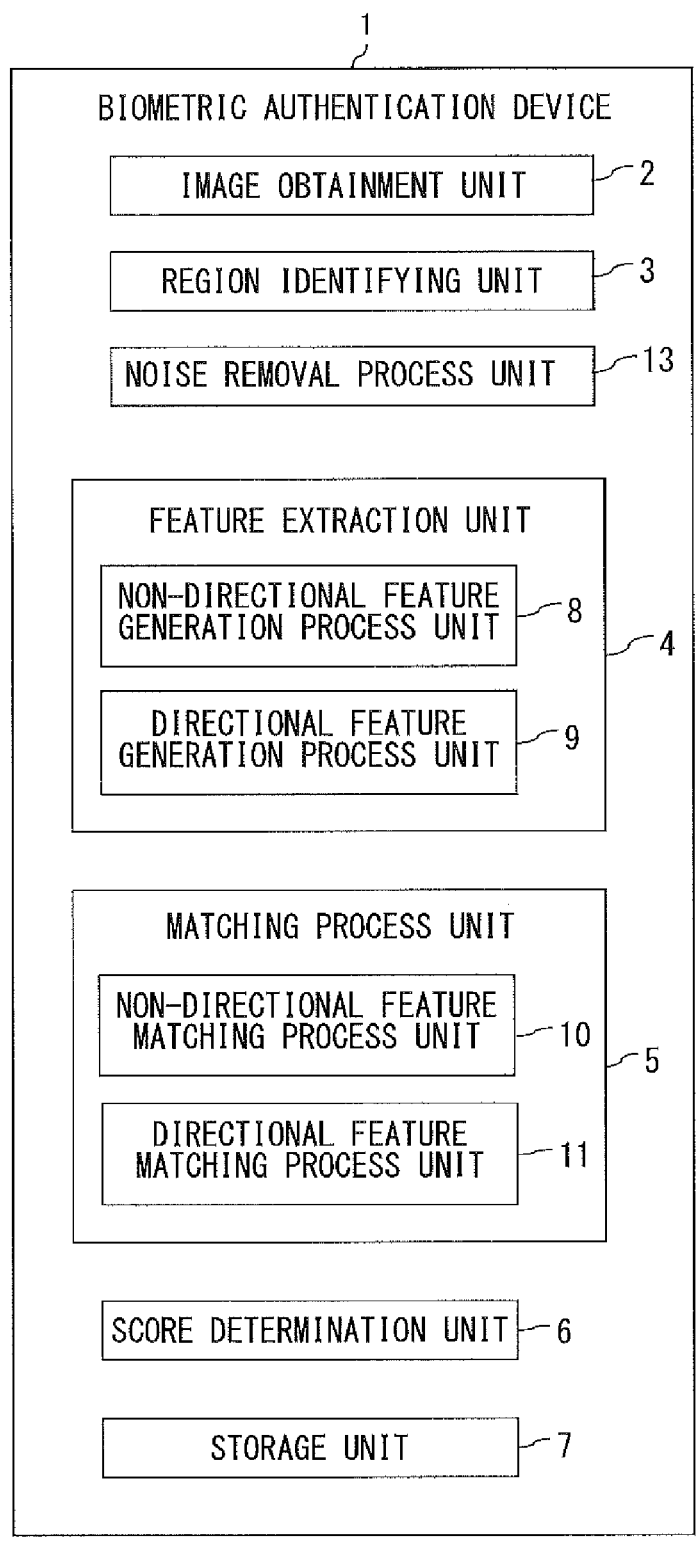
F I G. 1 9

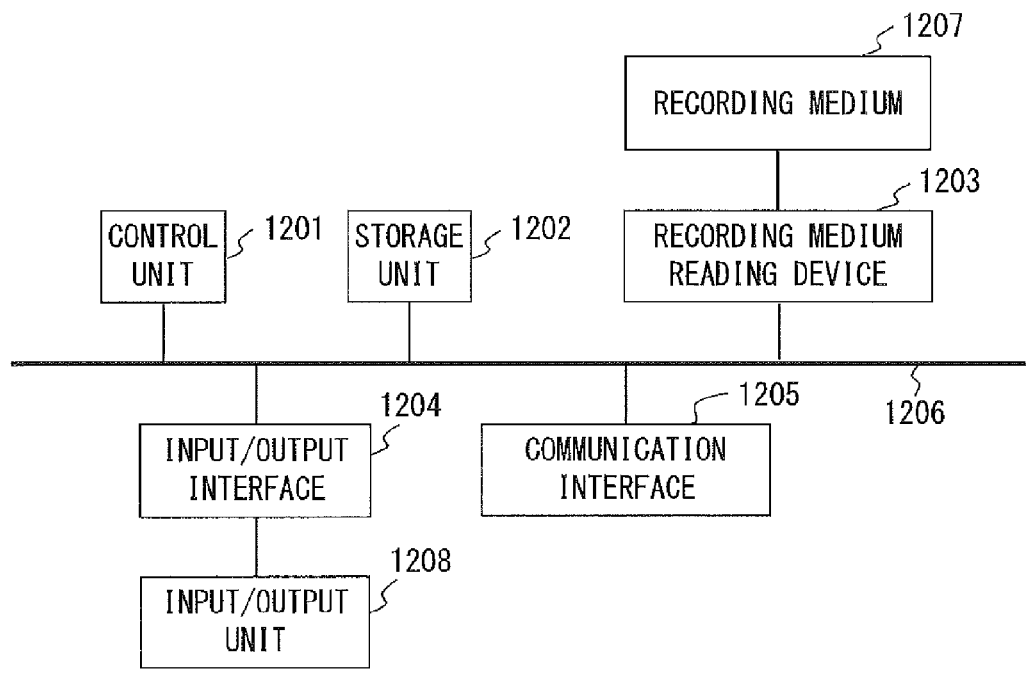
F I G. 2 5

BIOMETRICS AUTHENTICATION DEVICE AND BIOMETRICS AUTHENTICATION METHOD

CROSS-REFERENCE TO RELATED APPLICATION

This application is continuation application of International Application PCT/JP2014/058385 filed on Mar. 25, 2014 and designated the U.S., the entire contents of which are incorporated herein by reference.

FIELD

The embodiments of the present disclosure are related to a technique of biometrics authentication.

BACKGROUND

According to existing biometrics authentication devices, when biometrics information extracted from an image after photography and biometrics information that is registered in advance are identical to each other, the subject is determined to be the person who is to be authenticated. This biometrics information includes features that represent a palm pattern, a vein, etc., and when biometrics authentication is conducted by using a feature representing a vein, it is necessary to separate a feature representing a palm pattern from an image after photography so as to generate a feature that represents a vein with palm patterns removed to the maximum possible degree. As a method that separates a feature representing a palm pattern, for example a method that uses a polarization filter etc. so as to separate a palm pattern optically is known. As another method, a method based on multispectral photography for example is known.

Related Art Document: A. Ross, A. K. Jain, and J. Reisman, "A Hybrid fingerprint matcher", Pattern Recognition, vol. 36, no. 7, pp. 1661-1673, 2003.

SUMMARY

A biometrics authentication device according to an embodiment of the present disclosure includes a non-directional feature generation process unit configured to extract, from an input image, directional features corresponding to directions different from each other and to generate a non-directional feature on the basis of the directional features; a directional feature generation process unit configured to extract, from the input image, directional features corresponding to directions different from each other and to select, from among the directional features, a reference directional feature corresponding to a reference direction; a non-directional feature matching process unit configured to obtain a first degree of similarity between the non-directional feature and a registered non-directional feature stored in a storage unit; a directional feature matching process unit configured to obtain a second degree of similarity between the reference directional feature and a registered reference directional feature stored in the storage unit; and a determination unit configured to make a weight of the second degree of similarity smaller than a weight of the first degree of similarity and to determine whether or not a subject is a person to be authenticated, by using the first degree of similarity and the second degree of similarity.

A biometrics authentication method according to an embodiment of the present disclosure causes a computer to execute a process including extracting, from an input image, directional features corresponding to directions different from each other and generating a non-directional feature on the basis of the directional features; extracting, from the input image, directional features corresponding to directions different from each other and selecting, from among the directional features, a reference directional feature corresponding to a reference direction; obtaining a first degree of similarity between the non-directional feature and a registered non-directional feature stored in a storage unit; obtaining a second degree of similarity between the reference directional feature and a registered reference directional feature stored in the storage unit; and making a weight of the second degree of similarity smaller than a weight of the first degree of similarity and determining whether or not a subject is a person to be authenticated, by using the first degree of similarity and the second degree of similarity.

A non-transitory computer-readable recording medium according to an embodiment of the present disclosure which records a program causes a computer to execute a process including extracting, from an input image, directional features corresponding to directions different from each other and generating a non-directional feature on the basis of the directional features; extracting, from the input image, directional features corresponding to directions different from each other and selecting, from among the directional features, a reference directional feature corresponding to a reference direction; obtaining a first degree of similarity between the non-directional feature and a registered non-directional feature stored in a storage unit; obtaining a second degree of similarity between the reference directional feature and a registered reference directional feature stored in the storage unit; and making a weight of the second degree of similarity smaller than a weight of the first degree of similarity, and determining whether or not a subject is a person to be authenticated, by using the first degree of similarity and the second degree of similarity.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 shows an example of a biometrics authentication device according to a first embodiment;

FIG. 3 shows an example of a feature extraction unit according to the first embodiment;

FIG. 6 shows an example of a feature extraction unit according to a third embodiment;

FIG. 9 shows an example of a biometrics authentication device according to a fifth embodiment;

FIG. 10 shows an example of a data process unit;

FIG. 11 shows another example of a data process unit;

FIG. 16 shows an example of a feature extraction unit according to a ninth embodiment;

FIG. 19 shows an example of a biometrics authentication device according to a twelfth embodiment;

FIG. 25 shows an example of hardware of a biometrics authentication device.

DESCRIPTION OF EMBODIMENTS

First Embodiment

Figure 2:
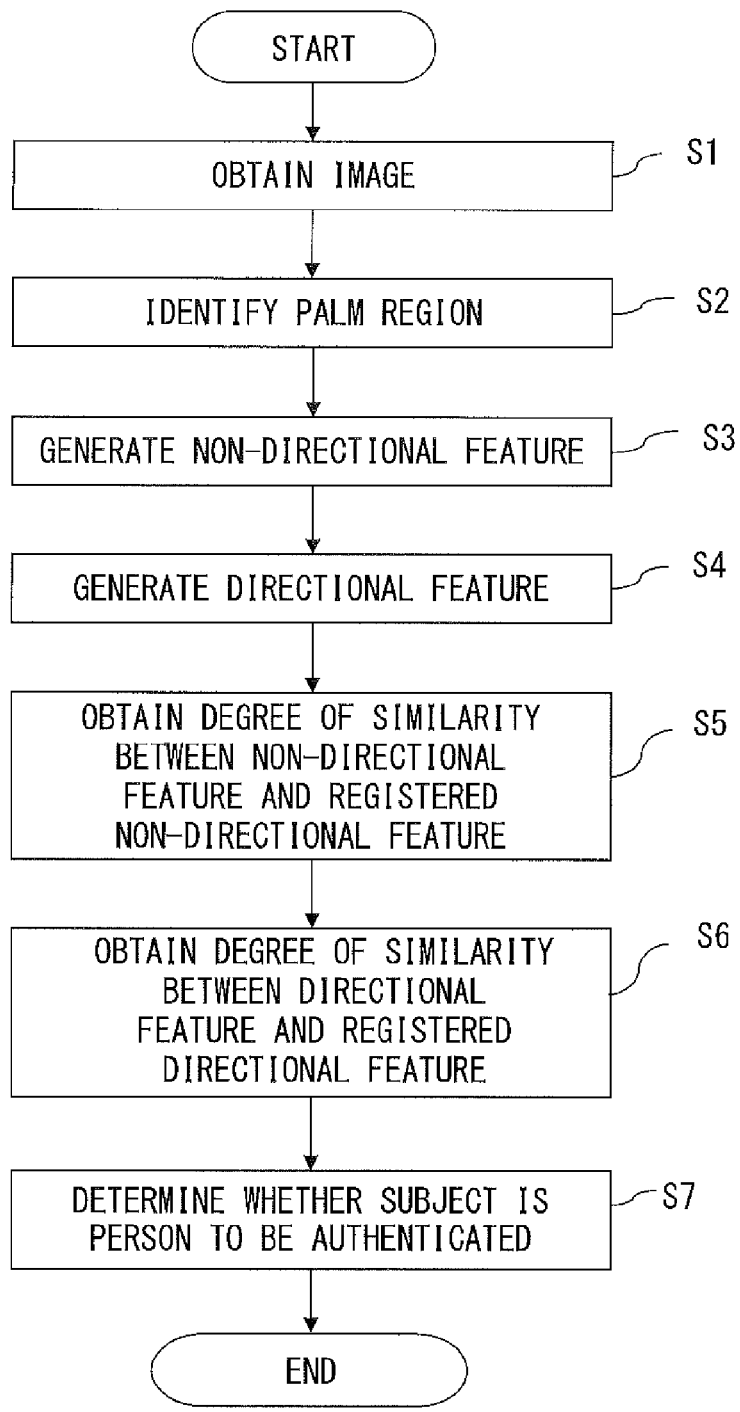
FIG. 2 shows a flowchart for a biometrics authentication method according to the first embodiment.

FIG. 1 shows an example of a biometrics authentication device according to a first embodiment.

A biometrics authentication device 1 shown in FIG. 1 includes an image obtainment unit 2, an region identifying unit 3, a feature extraction unit 4, a matching process unit 5, a score determination unit 6 (determination unit), and a storage unit 7.

The feature extraction unit 4 includes anon-directional feature generation process unit 8 and a directional feature generation process unit 9.

The matching process unit 5 includes a non-directional feature matching process unit 10 and a directional feature matching process unit 11.

FIG. 2 shows a flowchart for a biometrics authentication method according to the first embodiment.

First, the image obtainment unit 2 obtains an image of a hand of the subject (S1). For example, the image obtainment unit 2 is an image pickup device, and obtains a picked-up image of a hand of the subject by a single-panel image pick-up element and the color filters of RGB of a Bayer array.

Next, the region identifying unit 3 identifies a palm region (a region of interest (ROI)) of the palm corresponding to the subject's palm in the image obtained by the image obtainment unit 2 (S2).

Next, the non-directional feature generation process unit 8 generates a non-directional feature from palm region image f identified by the region identifying unit 3 (S3). Note that "non-directional" is defined as a characteristic by which the result of filter process S alone is rarely changed even when image rotation transform process $T_\theta$ or inverse transfer process $T_\theta^{-1}$, which is inverse to $T_\theta$, for various angles θ is inserted before filter process S in a case when filter process S is conducted on image f. In other words, "non-directional"

is defined as a characteristic by which $S(f)=T_\theta^{-1}(S(T_\theta(f)))$ is satisfied where θ represents an arbitrary angle.

Next, the directional feature generation process unit 9 generates a directional feature from palm region image f (S4). Note that "directional" is defined as a characteristic that is not non-directional.

Next, the non-directional feature matching process unit 10 obtains the degree of similarity between a non-directional feature generated by the non-directional feature generation process unit 8 and a registered non-directional feature, which is registered and stored in the storage unit 7 in advance (S5).

Next, the directional feature matching process unit 11 obtains the degree of similarity between a directional feature generated by the directional feature generation process unit 9 and a registered directional feature, which is registered and stored in the storage unit 7 in advance (S6).

Next, the score determination unit 6 determines whether or not the subject is the person to be authenticated on the basis of the degree of similarity obtained by the non-directional feature matching process unit 10 and the degree of similarity obtained by the directional feature matching process unit 11 (S7).

FIG. 3 shows an example of the feature extraction unit 4 according to the first embodiment.

The feature extraction unit 4 shown in FIG. 3 includes a filter 41, a point-wise maximum selection unit 42, a binarization unit 43, a skeletonizing unit 44, a directional feature selection unit 45, a binarization unit 46, and an AND operation unit 47.

The filter 41 performs a Gabor filter process for each of eight directions θ (0°, 22.5°, 45°, 67.5°, 90°, 112.5°, 135°, 157.5°) on image f of the input palm region, and obtains the respective filter responses (luminance values) as directional features $g_\theta$ (directional feature $g_{0°}$, directional feature $g_{22.5°}$, directional feature $g_{45°}$, directional feature $g_{67.5°}$, directional feature $g_{90°}$, directional feature $g_{112.5°}$, directional feature $g_{135°}$, directional feature $g_{157.5°}$). Note that the number of the directions θ set in the filtering process is not limited to eight and can be an arbitrary number equal to or greater than two. Also, the filtering process is not limited to a Gabor filter process and can be an arbitrary process that has a high filter response to a linear dark section of each direction θ in image f.

From among respective directional features $g_\theta(i,j)$ extracted from the filter 41, the point-wise maximum selection unit 42 outputs maximum directional feature $\max_\theta\{g_\theta(i,j)\}$ as non-directional feature g(i,j) as depicted by expression 1. Note that i represents the position in the horizontal axis of a two-dimensional coordinate when the position of each pixel in the palm region is made to correspond to a position in the two-dimensional coordinate, and j represents the position in the vertical axis in that two-dimensional coordinate.

$$g(i,j):=\max_\theta\{g_\theta(i,j)\}, (i,j) \in \text{ROI} \qquad \text{Expression 1}$$

As shown in expression 2, the binarization unit 43 outputs "1" as non-directional plane feature b(i,j) when non-directional feature g(i,j) output from the point-wise maximum selection unit 42 is a positive value, and outputs zero when non-directional feature g(i,j) is a value that is not a positive value. Non-directional plane feature b obtained at that moment is stored in the storage unit 7.

$$b(i,j) = \begin{cases} 1, & \text{if } g(i,j) > 0 \\ 0, & \text{other} \end{cases} \qquad \text{Expression 2}$$

While the above binarization unit 43 performs the binarization process by using a threshold process based on a simple constant of zero, a binarization process using adaptive-thresholding, which is of a higher level, may be performed.

As shown in expression 3, the skeletonizing unit 44 performs a skeletonizing process on non-directional plane feature b in order to obtain non-directional line feature LF. Note that skel represents a skeletonizing process. Also, non-directional line feature LF obtained at that moment is stored in the storage unit 7. Also, a line feature is an image made of a linear shape.

$$LF := skel(b) \qquad \text{Expression 3}$$

The directional feature selection unit 45 defines reference direction $\theta_r$, and also defines three relative directions $\theta_{r+\alpha}$ (relative directions $\theta_{r+45°}$, $\theta_{r+90°}$, and $\theta_{r+135°}$) obtained by shifting reference direction $\theta_r$ by 45 degrees each time. For example, when the palm region is identified with the palm on the guide, a direction that includes many filter responses based on the palm patterns can be known statistically. When a direction including many filter responses based on the palm patterns is known beforehand, a direction including many filter responses based on the palm patterns is defined as reference direction $\theta_r$.

From among respective directional features $g_\theta$ extracted from the filter 41, the directional feature selection unit 45 selects directional feature $g_\theta$ that corresponds to reference direction $\theta_r$, and treats it as directional feature $g_{\theta_r}$, selects directional feature $g_\theta$ that corresponds to relative direction $\theta_{r+45°}$, and treats it as directional feature $g_{\theta_{r+45°}}$, selects directional feature $g_\theta$ that corresponds to relative direction $\theta_{r+90°}$, and treats it as directional feature $g_{\theta_{r+90°}}$, and selects directional feature $g_\theta$ that corresponds to relative direction $\theta_{r+135°}$, and treats it as directional feature $g_{\theta_{r+135°}}$. For example, when 0° is defined as reference direction $\theta_r$, a directional feature selection unit 25 selects directional feature $g_{0°}$ as directional feature $g_{\theta_r}$ corresponding to reference direction $\theta_r$, selects directional feature $g_{45°}$ as directional feature $g_{\theta_{r+45°}}$ corresponding to relative direction $\theta_{\theta_{r+45°}}$, selects directional feature $g_{90°}$ as directional feature $g_{\theta_r}$ corresponding to relative direction $\theta_{\theta_{r+90°}}$, and selects directional feature $g_{135°}$ as directional feature $g_{\theta_r}$ corresponding to relative direction $\theta_{\theta_{r+135°}}$ from among directional feature $g_{0°}$, directional feature $g_{22.5°}$, directional feature $g_{45°}$, directional feature $g_{67.5°}$, directional feature $g_{90°}$, directional feature $g_{112.5°}$, directional feature $g_{135°}$, and directional feature $g_{157.5°}$ extracted from the filter 41. Note that the number of directional features $g_\theta$ selected by the directional feature selection unit 45 is not limited to four.

The binarization unit 46 performs a binarization process on each of directional feature $g_{\theta_r}$, directional feature $g_{\theta_{r+45°}}$, directional feature $\theta_{r+90°}$, and directional feature $\theta_{r+135°}$ selected by the directional feature selection unit 45, and outputs the results as directional plane features $b_1$ through $b_4$.

For example, the binarization unit 46 outputs "1" as directional plane feature $b_1(i,j)$ when directional feature $g_{\theta_r}(i,j)$ is positive as expressed by expression 4, and outputs zero as directional plane feature $b_1(i,j)$ when directional feature $g_{\theta_r}(i,j)$ is not positive. Note that directional plane feature $b_1$ obtained at that moment is stored in the storage unit 7.

$$b_1(i, j) = \begin{cases} 1, & \text{if } g_{\theta r}(i, j) > 0 \\ 0, & \text{other} \end{cases} \qquad \text{Expression 4}$$

The binarization unit 46 outputs "1" as directional plane feature $b_2(i,j)$ when directional feature $g_{\theta_{r+45°}}(i,j)$ is positive, and outputs zero as directional plane feature $b_2(i,j)$ when directional feature $g_{\theta_{r+45°}}(i,j)$ is not positive, as expressed by expression 5. Note that directional plane feature $b_2$ obtained at that moment is stored in the storage unit 7.

$$b_2(i, j) = \begin{cases} 1, & \text{if } g_{\theta r+45°}(i, j) > 0 \\ 0, & \text{other} \end{cases} \qquad \text{Expression 5}$$

The binarization unit 46 outputs "1" as directional plane feature $b_3(i,j)$ when directional feature $g_{\theta_{r+90°}}(i,j)$ is positive, and outputs zero as directional plane feature $b_3(i,j)$ when directional feature $g_{\theta_{r+90°}}(i,j)$ is not positive, as expressed by expression 6. Note that directional plane feature $b_3$ obtained at that moment is stored in the storage unit 7.

$$b_3(i, j) = \begin{cases} 1, & \text{if } g_{\theta r+90°}(i, j) > 0 \\ 0, & \text{other} \end{cases} \qquad \text{Expression 6}$$

The binarization unit 46 outputs "1" as directional plane feature $b_4(i,j)$ when directional feature $g_{\theta_{r+135°}}(i,j)$ is positive, and outputs zero as directional plane feature $b_4(i,j)$ when directional feature $g_{\theta_{r+135°}}(i,j)$ is not positive, as expressed by expression 7. Note that directional plane feature $b_4$ obtained at that moment is stored in the storage unit 7.

$$b_4(i, j) = \begin{cases} 1, & \text{if } g_{\theta r+135°}(i, j) > 0 \\ 0, & \text{other} \end{cases} \qquad \text{Expression 7}$$

While the above binarization unit 46 performs the binarization process by using a threshold process based on a simple constant of zero, a binarization process using adaptive-thresholding, which is of a higher level, may be performed.

The AND operation unit 47 performs an AND operation on directional plane features $b_1$ through $b_4$ as expressed by expression 8, and outputs the result thereof as non-directional point feature CPF (Cross-point Feature). Note that non-directional point feature CPF obtained at that moment is stored in the storage unit 7. Also, a point feature is an image of points.

$$CPF(i, j) := \bigwedge_{1 \leq k \leq 4} b_k(i, j), \ (i, j) \in ROI \qquad \text{Expression 8}$$

Figure 4:
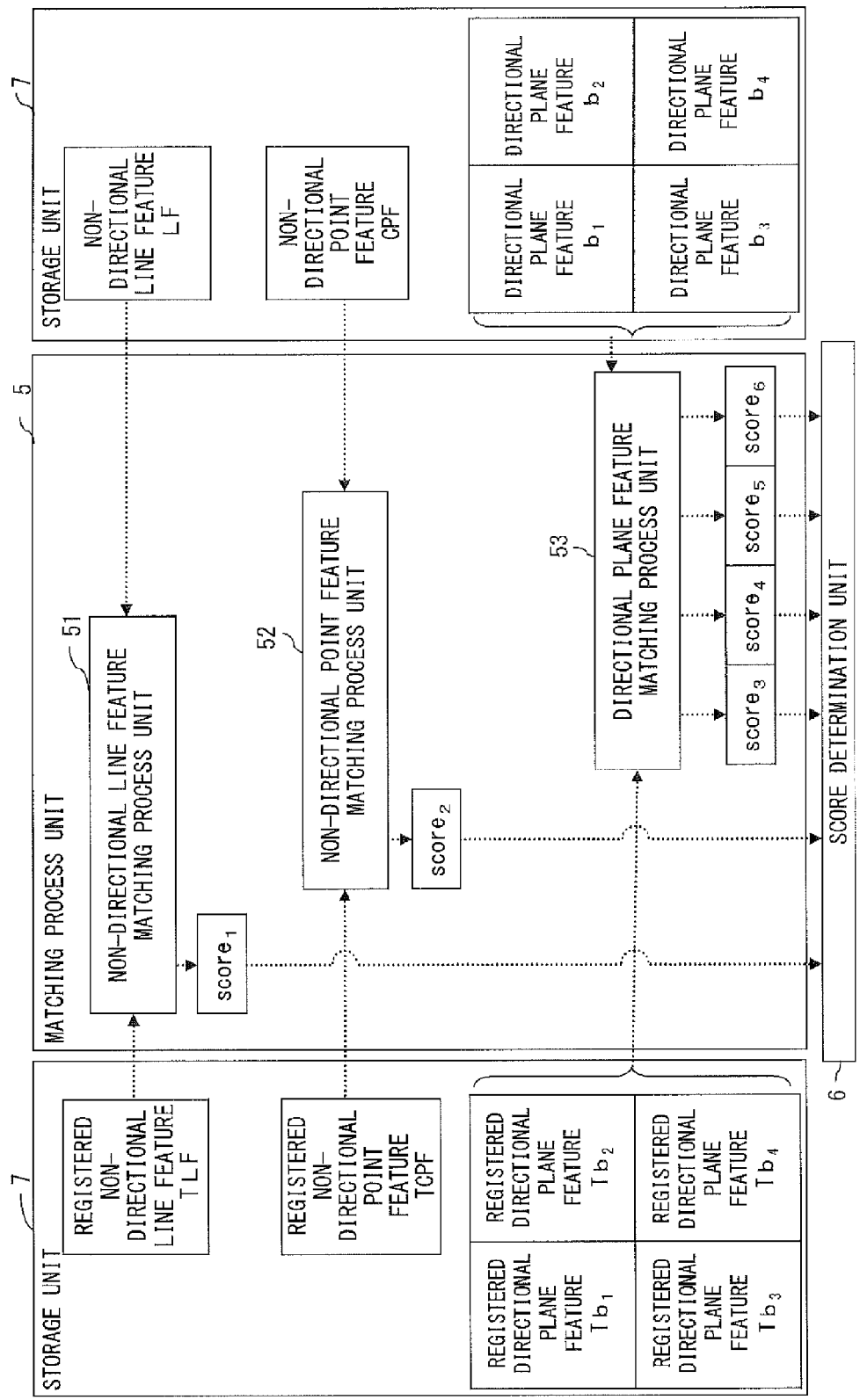
FIG. 4 shows an example of a matching process unit according to the first embodiment.

FIG. 4 shows an example of the matching process unit 5 according to the first embodiment.

The matching process unit 5 shown in FIG. 4 includes a non-directional line feature matching process unit 51, a non-directional point feature matching process unit 52, and a directional plane feature matching process unit 53.

The non-directional line feature matching process unit 51 obtains degree of similarity $score_1$ between non-directional line feature LF output from the skeletonizing unit 44 and stored in the storage unit 7 and registered non-directional line feature TLF registered and stored in the storage unit 7 in advance.

The non-directional point feature matching process unit 52 obtains degree of similarity $score_2$ between non-directional point feature CPF output from the AND operation unit 47 and stored in the storage unit 7 and registered non-directional point feature TCPF registered and stored in the storage unit 7 in advance.

The directional plane feature matching process unit 53 obtains the degree of similarity of directional plane feature score$_3$ between directional plane feature b$_1$ output from the binarization unit 46 and stored in the storage unit 7 and registered directional plane feature Tb$_1$ registered and stored in the storage unit 7 in advance. Also, the directional plane feature matching process unit 53 obtains degree of similarity score$_4$ between directional plane feature b$_2$ output from the binarization unit 46 and stored in the storage unit 7 and registered directional plane feature Tb$_2$ registered and stored in the storage unit 7 in advance. Also, the directional plane feature matching process unit 53 obtains degree of similarity score$_5$ between directional plane feature b$_5$ output from the binarization unit 46 and stored in the storage unit 7 and registered directional plane feature Tb$_5$ registered and stored in the storage unit 7 in advance. Also, the directional plane feature matching process unit 53 obtains degree of similarity score$_6$ between directional plane feature b$_6$ output from the binarization unit 46 and stored in the storage unit 7 and registered directional plane feature Tb$_6$ registered and stored in the storage unit 7 in advance.

The score determination unit 6 weights score$_1$ through score$_6$ by constant a$_k$ or constant c as expressed by expression 9, and outputs the total of weighted score$_1$ through score$_6$ as score. Then, when for example score is equal to or greater than a threshold, the score determination unit 6 determines that the subject is a person to be authenticated.

$$\text{SCORE} := \sum_{1 \leq k \leq 6} a_k * score_k + c \quad \text{Expression 9}$$

Hereinafter, regarding an arbitrary k, a case when a$_k$>0 is satisfied and the absolute value of constant a$_k$ is relatively greater than another constant a$_k$ is referred to as active use of scorek (an effect that actively affirms the degree of similarity) and the other cases are referred to as passive use of scorek.

When for example direction θ° of directional feature g$_θ$ estimated to include many filter responses corresponding to palm patterns is defined as reference direction θ$_r$, it is possible to determine whether or not the subject is the person to be authenticated, by passively using degree of similarity score$_3$ corresponding to reference direction θ$_r$ from among degrees of similarity score$_3$ through score$_6$ so as to reduce an influence of the palm pattern. Thereby, it is possible to decrease the false acceptance rate even when a non-directional feature includes not only a vein but also a palm pattern. In other words, according to the biometrics authentication device 1 of the first embodiment, even when the method that physically separates a feature representing a palm pattern from an image cannot be applied, the false acceptance rate can be prevented from increasing.

Also, a palm pattern is mainly made of wrinkles that are made when the hand is clasped and veins extend in the directions of the fingers from the wrist and accordingly veins are in the direction perpendicular to the palm pattern. This makes it possible to determine whether or not the subject is a person to be authenticated, by actively using degree of similarity score$_5$ corresponding to directional feature g$_{θ_r+90°}$ in the direction perpendicular to reference direction θ$_r$ in order to emphasize the veins. Thereby, it is possible to decrease the false rejection rate (FRR).

As described above, according to the biometrics authentication device 1 of the first embodiment, it is possible to hold an input image in such a manner that a non-directional feature group and a directional feature group are separated, thereby obtaining correlation for each of the groups in the matching process unit 5, which is located in a later stage, and by using them actively and passively in the score determination unit 6, it is possible to conduct robust authentication that does not depend upon polarization for each direction.

Specifically, according to the biometrics authentication device 1 of the first embodiment, it is possible to hold, as feature data, a plurality of a plane feature, a line feature and a point feature from among non-directional features and also to hold, as feature data, both of a plane feature and a line feature from among directional features so as to use such features for matching. As described above, it is possible to hold information in a multi-stage expression form of non-directional features and directional features so as to obtain correlation for each expression form in the matching process unit 5, which is in a later stage, and by actively or passively using them in the score determination unit 6, it is possible to conduct robust authentication that does not depend upon polarization for each direction.

Also, in the biometrics authentication device 1 according to the first embodiment, the AND operation unit 47 and the non-directional point feature matching process unit 52 may be omitted.

Second Embodiment

Next, explanations will be given for the biometrics authentication device 1 according to a second embodiment. Note that the configuration is similar to that of the first embodiment except for the matching process unit 5.

Figure 5:
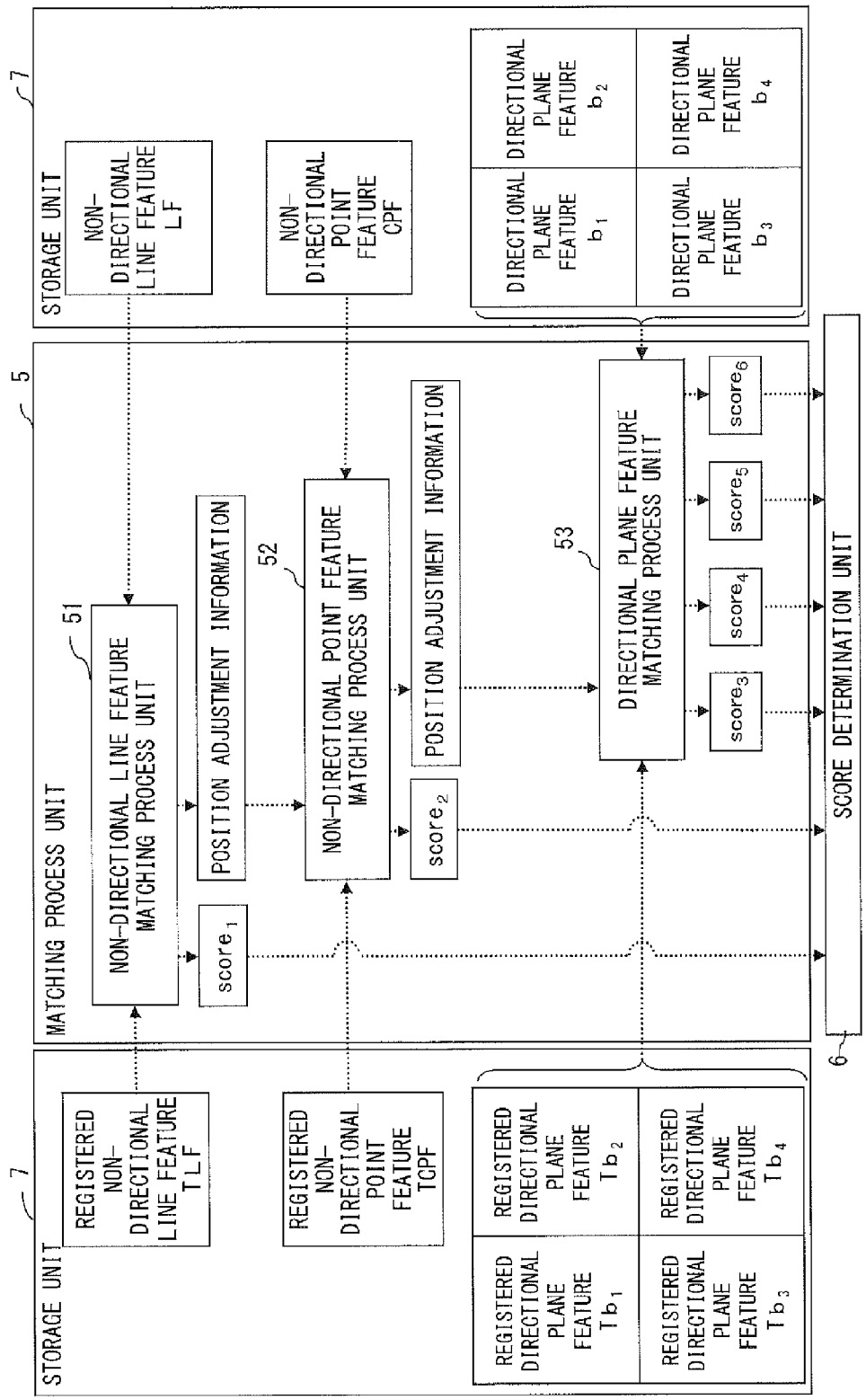
FIG. 5 shows an example of a matching process unit according to a second embodiment.

FIG. 5 shows an example of the matching process unit 5 according to the second embodiment. Note that constituents similar to those in the configuration shown in FIG. 4 are denoted by the same symbols and explanations thereof will be omitted.

In the matching process unit 5 shown in FIG. 5, position adjustment information obtained by a position adjustment process conducted when degree of similarity score$_1$ is obtained by the non-directional line feature matching process unit 51 is used for a position adjustment process conducted when degree of similarity score$_2$ is obtained by the non-directional point feature matching process unit 52, and position adjustment information obtained by a position adjustment process conducted when degree of similarity score$_2$ is obtained by the non-directional point feature matching process unit 52 is used for a position adjustment process conducted when degrees of similarity score$_3$ through score$_6$ are obtained by the directional plane feature matching process unit 53.

In other words, the non-directional line feature matching process unit 51 uses for example a degree-of-similarity calculation process that is correlation based in order to obtain degree of similarity score$_1$ between non-directional line feature LF and registered non-directional line feature TLF, and feeds, to the non-directional point feature matching process unit 52, position adjustment information (such as transform coefficients etc. used for Affine transform, projective transform, Thin-Plate Spline transform, etc. which are geometric transforms) obtained by the position adjustment process performed for that obtainment.

Next, the non-directional point feature matching process unit 52 uses position adjustment information received from the non-directional line feature matching process unit 51, as initial position adjustment information for the position adjustment process, obtains degree of similarity $score_2$ between non-directional point feature CPF and registered non-directional point feature TCPF, and feeds, to the directional plane feature matching process unit 53, position adjustment information obtained in the position adjustment process performed at that time.

Also, the directional plane feature matching process unit 53 uses position adjustment information received from the non-directional point feature matching process unit 52, as initial position adjustment information for a position adjustment process, and obtains degrees of similarity $score_3$ through $score_6$ between directional plane features $b_1$ through $b_4$ and registered directional plane features $Tb_1$ through $Tb_4$.

Thereby, it is possible to solve the following problems (1) through (3) simultaneously.

Problem (1): Because a directional feature depends upon a direction, when it shifts from reference direction $\theta_r$ depending upon the states of the hand being held, the directional feature tends to vary easily.

Problem (2): Because directional plane feature b and registered directional plane feature Tb change easily, there are many cases where there are not many corresponding common feature points and the position adjustment process easily fails for these points in the matching process unit 5.

Problem (3): When multi-stage configuration is used, particularly when directional plane feature b is used as in the first embodiment, this problem is more serious, and a small shift in the position adjustment leads to a shift between directional plane feature b and registered directional plane feature Tb, resulting in a tendency to decrease greatly degrees of similarity $score_3$ through $score_6$.

Solving problems (1) through (3) makes it possible to perform position adjustment that is tolerant to angle variation in image obtainment results, that is robust and that is highly accurate.

Third Embodiment

Next, explanations will be given for the biometrics authentication device 1 according to a third embodiment. Note that the configuration is similar to that of the first embodiment except for the feature extraction unit 4.

FIG. 6 shows an example of the feature extraction unit 4 according to the third embodiment. Note that constituents similar to those in the configuration shown in FIG. 3 are denoted by the same symbols and explanations thereof will be omitted.

The directional feature selection unit 45 shown in FIG. 6 defines, as reference direction $\theta_r$, direction $\theta$ corresponding to directional feature $g_\theta$ that results in the maximum filter output energy, from among respective directional features $g_\theta$ extracted from the filter 41.

For example, the directional feature selection unit 45 defines maximum output direction ($\mathrm{argmax}_\psi\{\|g_\psi\|L^2\}$)) as reference direction $\theta_r$ as expressed by expression 10. Note that $\|g_\varphi\|L^2$ ($L^2$ norm) is defined by expression 11.

$$\theta_r = \mathrm{argmax}_\psi\{\|g_\psi\|L^2\} \qquad \text{Expression 10}$$

$$\|g_\varphi\|L^2 = \left(\sum_{(i,j)\in ROI} |g_\varphi(i,j)|^2\right)^{\frac{1}{2}} \qquad \text{Expression 11}$$

Note that it is possible to select, in addition to $L^2$ norm, $L^p$ norm($1 \leq p \leq \infty$), which is more common, as an example of filter output energy.

This makes it possible to solve the following problems (4) through (7) simultaneously.

Problem (4): In an authentication system with a higher degree of freedom for the subject, particularly in a guideless authentication system, when the ways the hand is held vary or when a light-shielding guide etc. is used, the outline of the hand is not expressed in the obtained image, the angle of the hand is not known beforehand in the region identifying unit 3 in some cases, and reference direction $\theta_r$ is not defined in these cases.

Problem (5): When both the right and left hands can be held, a case is possible in which reference direction $\theta_r$ of each of the hands is defined so as to use the average of these reference directions $\theta_r$, while such a case results in a greater shift between the average of reference directions $\theta_r$ and each hand of the subject.

Problem (6): Even in a case where the subject has a palm pattern output that is strong, the direction in which the palm pattern is output the most varies from one individual subject to another, making it impossible for an already-known criterion that was defined uniformly to include a palm pattern in directional feature $g_\theta$ that sufficiently corresponds to reference direction $\theta_r$.

Problem (7): Due to problems (4) through (6), separation between veins and palm patterns is not enough, making it impossible to attain a sufficient effect of suppressing the false acceptance rate in a matching process based on directional features.

By solving problems (4) through (7), it is possible to conduct the process adaptively by selecting the maximum output direction as reference direction $\theta_r$ for each hand of subjects so that the palm pattern is captured highly accurately, making it possible to cause enough separation between the veins and the palm pattern and to improve the authentication accuracy (particularly a reduction in the false acceptance rate) even when there is variation in directions of palm patterns between subjects, or further in a case of an authentication system with a higher degree of freedom, a case of the image obtainment unit 2 that cannot photograph the entire palm, or a case in which the patterns of both right and left hands of the subject are held.

From among respective directional features $g_\theta$ extracted from the filter 41, the directional feature selection unit 45 defines direction $\theta$ corresponding to directional feature $g_\theta$ that leads to the maximum $L^2$ norm, as reference direction $\theta_r$ that is the maximum output direction, and defines relative directions $\theta_{r+45°}$, $\theta_{r+90°}$, and $\theta_{r+135°}$ on the basis of that reference direction $\theta_r$.

Next, from among respective directional features $g_\theta$ extracted from the filter 41, the directional feature selection unit 45 selects directional feature $g_\theta$ corresponding to reference direction $\theta_r$ as directional feature $g_{\theta_{max}}$, selects directional feature $g_\theta$ corresponding to relative direction $\theta_{r+45°}$ as directional feature $g_{\theta_{max+45°}}$, selects directional feature $g_\theta$ corresponding to relative direction $\theta_{r+90°}$ as directional feature $g_{\theta_{max+90°}}$, and selects directional feature $g_\theta$ corresponding to relative direction $\theta_{r+135°}$ as directional feature $g_{\theta_{max+135°}}$.

The binarization unit 46 performs a binarization process on each of maximum directional feature $g_{\theta_{max}}$, directional feature $g_{\theta_{max+45°}}$, directional feature $\theta_{max+90°}$, and directional feature $\theta_{max+135°}$ selected by the directional feature selection unit 45, and outputs the results thereof as directional plane features $b_1$ through $b_4$.

When a palm region includes more palm patterns than veins etc., among directional features $g_\theta$ extracted from the filter 41, directional features $g_{\theta_{max}}$ corresponding to the maximum output direction tend to include many palm patterns. Accordingly, even when the system is a guideless type or the hand of the subject is shifted from the guide, it is possible to select directional feature $g_\theta$ including many palm patterns as directional feature $g_\theta$ corresponding to reference direction $\theta_r$ by defining the maximum output direction as reference direction $\theta_r$. Thereby, by passively using degree of similarity score$_3$ corresponding to this reference direction $\theta_r$, it is possible to determine whether or not the person is the person to be authenticated, by suppressing an influence of the palm patterns and thereby to improve the authentication accuracy.

Fourth Embodiment

Next, explanations will be given for the biometrics authentication device 1 according to a fourth embodiment. Note that the configuration is similar to that of the first embodiment except for the matching process unit 5.

Figure 7:
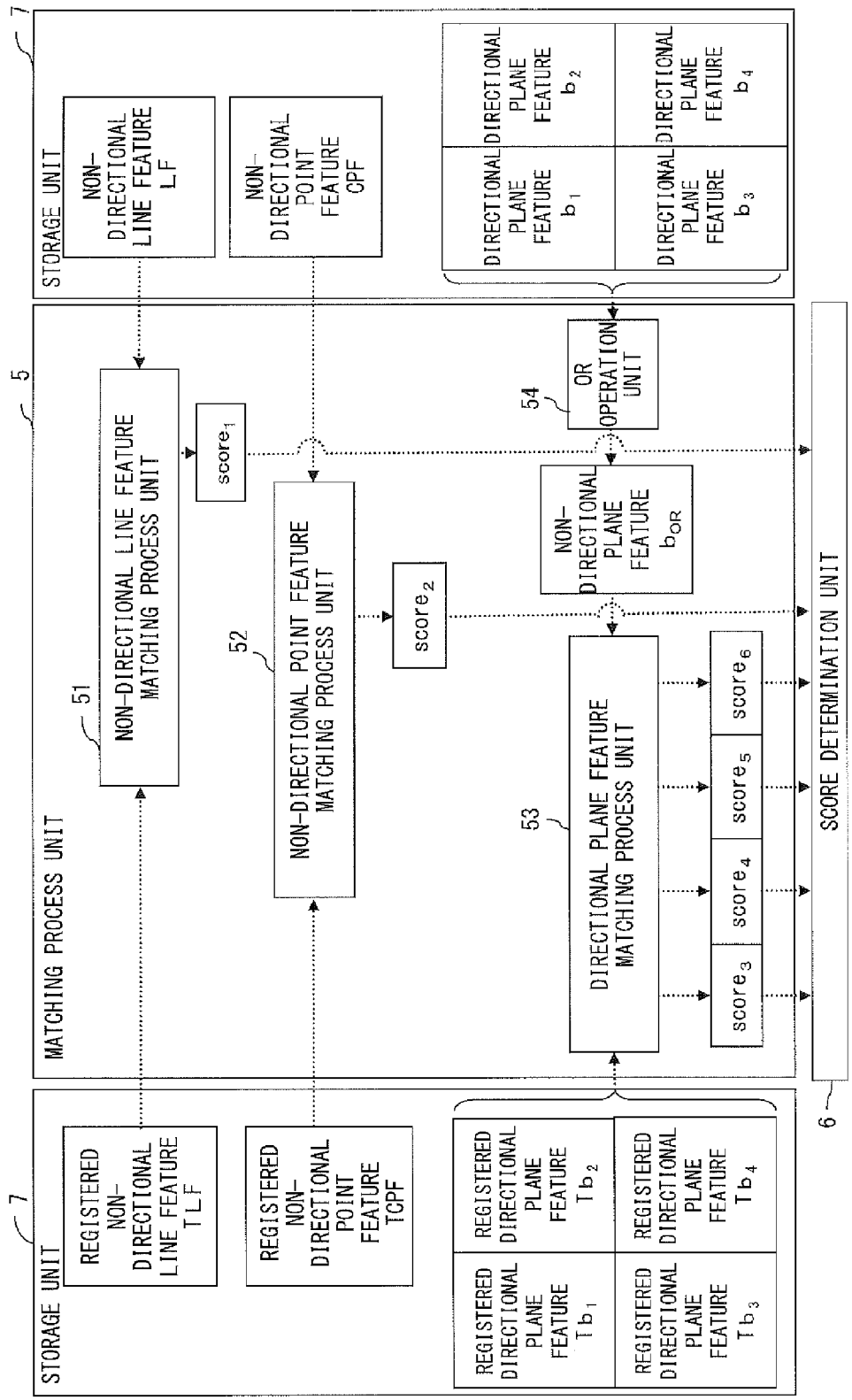
FIG. 7 shows an example of a matching process unit according to a fourth embodiment.

FIG. 7 shows an example of the matching process unit 5 according to the fourth embodiment. Note that constituents similar to those in the configuration shown in FIG. 4 are denoted by the same symbols and explanations thereof will be omitted.

The matching process unit 5 shown in FIG. 7 includes an OR operation unit 54 in addition to the non-directional line feature matching process unit 51, the non-directional point feature matching process unit 52, and the directional plane feature matching process unit 53.

As expressed by expression 12, the OR operation unit 54 shown in FIG. 7 performs an OR operation on directional plane features $b_1$ through $b_4$ output from the binarization unit 46 and stored in the storage unit 7, and outputs the operation results thereof as non-directional plane feature $b_{OR}$.

$$b_{OR}(i,j):=b_1(i,j) \lor b_2(i,j) \lor b_3(i,j) \lor b_4(i,j), (i,j)\in \text{ROI} \quad \text{Expression 12}$$

The directional plane feature matching process unit 53 obtains the degrees of similarity between non-directional plane feature $b_{OR}$ and registered directional plane features $Tb_1$ through $Tb_4$, registered and stored in the storage unit 7 in advance, and outputs these degrees of similarity as degrees of similarity score$_3$ through score$_6$.

Figure 8:
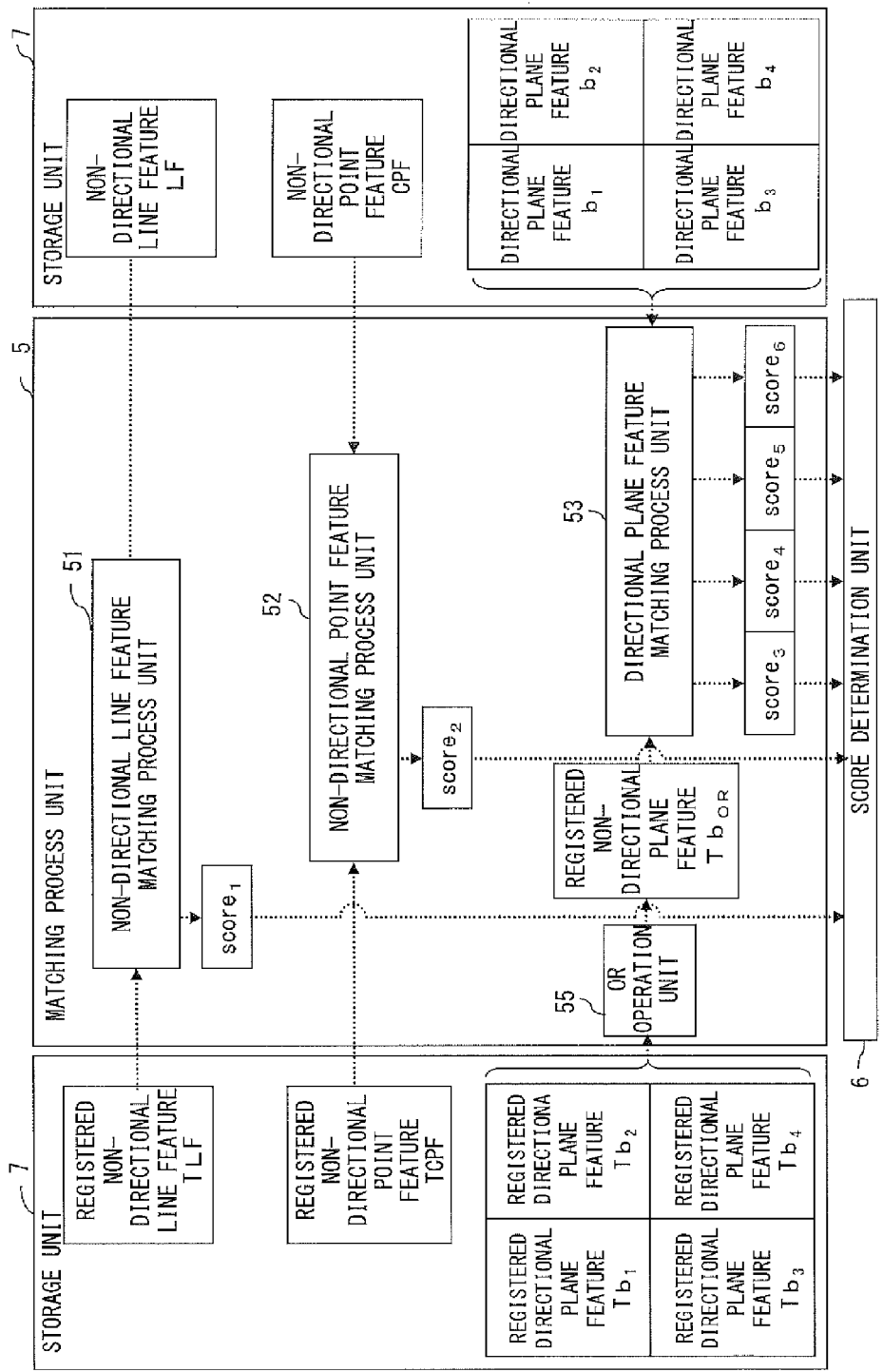
FIG. 8 shows an example of the matching process unit according to the fourth embodiment.

Also, FIG. 8 shows another example of the matching process unit 5 according to the fourth embodiment. Note that constituents similar to those in the configuration shown in FIG. 4 are denoted by the same symbols and explanations thereof will be omitted.

The matching process unit 5 shown in FIG. 8 includes an OR operation unit 55 in addition to the non-directional line feature matching process unit 51, the non-directional point feature matching process unit 52, and the directional plane feature matching process unit 53.

As expressed by expression 13, the OR operation unit 55 shown in FIG. 8 performs an OR operation on registered directional plane features $Tb_1$ through $Tb_4$ registered and stored in the storage unit 7 in advance, and outputs the operation results thereof as registered non-directional plane feature $Tb_{OR}$.

$$Tb_{OR}(i,j):=Tb_1(i,j) \lor Tb_2(i,j) \lor Tb_3(i,j) \lor Tb_4(i,j), (i,j)\in \text{ROI} \quad \text{Expression 13}$$

The directional plane feature matching process unit 53 obtains the degrees of similarity between registered non-directional plane feature $Tb_{OR}$ and directional plane features $b_1$ through $b_4$ output from the binarization unit 46 and stored in the storage unit 7, and outputs the degrees of similarity as degrees of similarity score$_3$ through score$_6$.

Thereby, it is possible to solve problems (1) and (2) above simultaneously, making it possible to increase the accuracy of the matching process and thereby to improve the robustness.

Non-directional plane feature $b_{OR}$ and registered non-directional plane feature $Tb_{OR}$ have more information than directional plane feature $b$ or registered directional plane feature $Tb$, and accordingly even when the direction of the palm pattern in the palm region is slightly shifted from reference direction $\theta_r$, that shift can be corrected easily, making it possible to prevent a decrease in degrees of similarity score$_3$ through score$_6$ due to the shift. In other words, it is possible to increase the matching accuracy and to increase the authentication accuracy.

Fifth Embodiment

Next, the biometrics authentication device 1 according to a fifth embodiment will be explained.

FIG. 9 shows an example of the biometrics authentication device 1 according to the fifth embodiment. Note that constituents similar to those in the configuration shown in FIG. 1 are denoted by the same symbols and explanations thereof will be omitted.

The biometrics authentication device 1 shown in FIG. 9 includes a data process unit 12 in addition to the image obtainment unit 2, the region identifying unit 3, the feature extraction unit 4, the matching process unit 5, the score determination unit 6, and the storage unit 7.

The data process unit 12 performs an AND operation and an OR operation on directional plane features $b_1$ through $b_4$ that are output from the directional feature generation process unit 9 and stored in the storage unit 7.

FIG. 10 shows an example of the data process unit 12.

The data process unit 12 shown in FIG. 10 includes an OR operation unit 121 and an AND operation unit 122.

As expressed by expression 12 above, the OR operation unit 121 performs an OR operation on directional plane features $b_1$ through $b_4$, and makes the storage unit 7 store the operation results thereof as approximated non-directional plane feature $b_{OR}$. Approximated non-directional plane feature $b_{OR}$ is approximate to non-directional plane feature $b$ output from the binarization unit 43, eliminating the necessity of making the storage unit 7 store non-directional plane feature $b$ output from the binarization unit 43 and thereby making it possible to reduce the amount of information stored in the storage unit 7. When an external storage unit is made to store data via a network, the amount of data can be suppressed, making it possible to prevent the communication speed of the network from becoming lower.

As expressed by expression 14, the AND operation unit 122 performs an AND operation on directional plane features $b_1$ through $b_4$, and makes the storage unit 7 store the operation results thereof as approximated non-directional point feature $b_{AND}$. Approximated non-directional point feature $b_{AND}$ is approximate to non-directional point feature CFF output from the AND operation unit 47, eliminating the necessity of making the storage unit 7 store non-directional point feature CPF output from the AND operation unit 47 and thereby making it possible to reduce the amount of information stored in the storage unit 7. When an external storage unit is made to store data via a network, the amount of data can be suppressed, making it possible to prevent the communication speed of the network from becoming lower. Also, it is possible to omit the AND operation unit 47, making it possible to simplify the configuration of the feature extraction unit 4.

$$b_{AND}(i,j):=b_1(i,j) \wedge b_2(i,j) \wedge b_3(i,j) \wedge b_4(i,j), (i,j) \in \text{ROI} \quad \text{Expression 14}$$

FIG. 11 shows another example of the data process unit 12. Note that constituents similar to those in the configuration shown in FIG. 10 are denoted by the same symbols and explanations thereof will be omitted.

The data process unit 12 shown in FIG. 11 includes a skeletonizing unit 123 in addition to the OR operation unit 121 and the AND operation unit 122.

The skeletonizing unit 123 performs a skeletonizing process on approximated non-directional plane feature $b_{OR}$ output from the OR operation unit 121, and makes the storage unit 7 store the process result thereof as approximated non-directional line feature $b_{LF}$. Approximated non-directional line feature $b_{LF}$ is approximate to non-directional line feature LF output from the skeletonizing unit 44, eliminating the necessity of making the storage unit 7 store non-directional line feature LF output from the skeletonizing unit 44 and thereby making it possible to reduce the amount of information stored in the storage unit 7. When an external storage unit is made to store data via a network, the amount of data can be suppressed, making it possible to prevent the communication speed of the network from becoming lower. Also, it is possible to omit the point-wise maximum selection unit 42, the binarization unit 43 and the skeletonizing unit 44, making it possible to simplify the configuration of the feature extraction unit 4.

Sixth Embodiment

Next, explanations will be given for the biometrics authentication device 1 according to a sixth embodiment. Note that the configuration is similar to that of the first embodiment except for the matching process unit 5.

Figure 12:
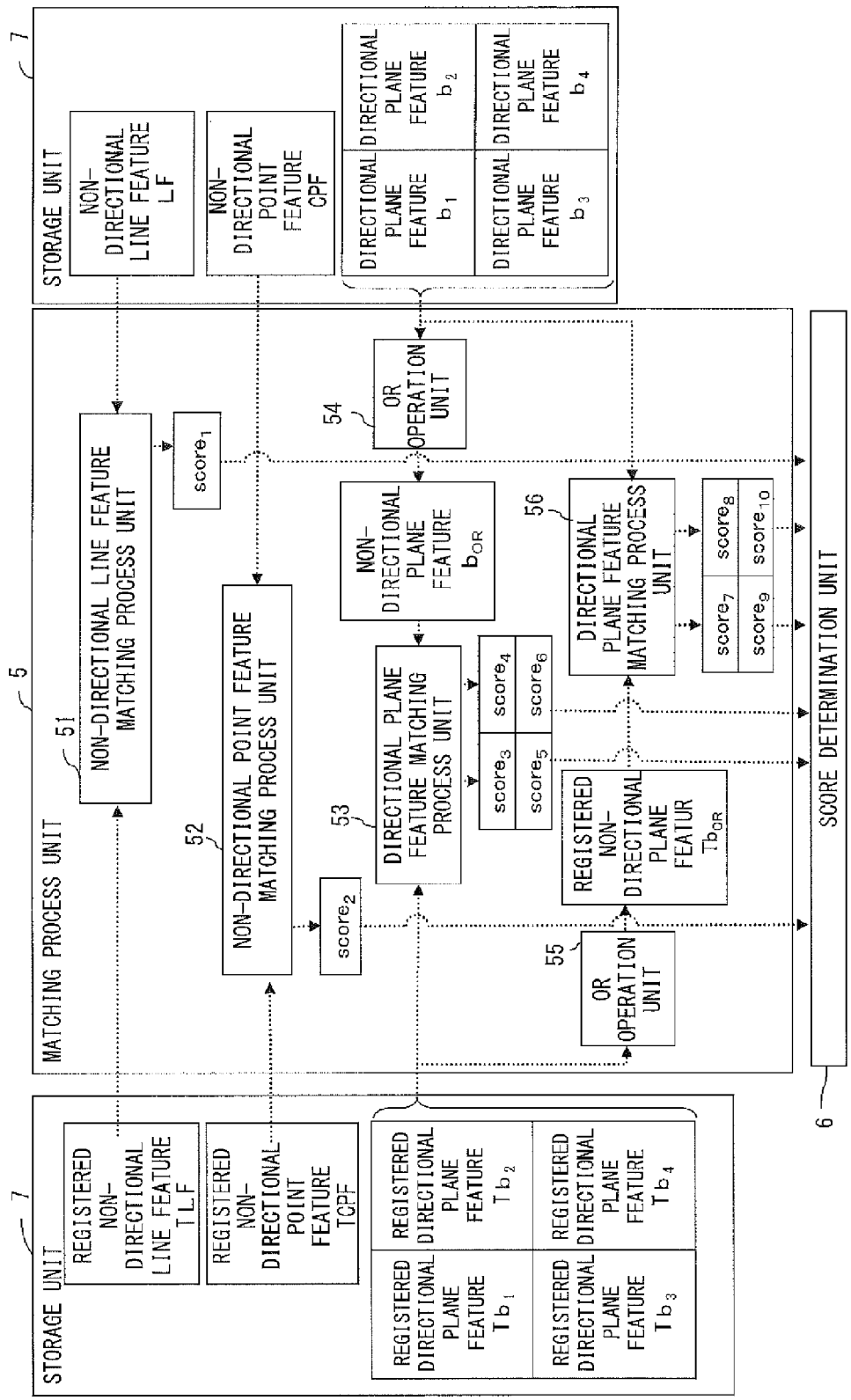
FIG. 12 shows an example of a matching process unit according to a sixth embodiment.

FIG. 12 shows an example of the matching process unit 5 according to the sixth embodiment. Note that constituents similar to those in the configuration shown in FIG. 7 or FIG. 8 are denoted by the same symbols and explanations thereof will be omitted.

The matching process unit 5 shown in FIG. 12 includes a directional plane feature matching process unit 56 in addition to the non-directional line feature matching process unit 51, the non-directional point feature matching process unit 52, the directional plane feature matching process unit 53, the OR operation unit 54, and the OR operation unit 55.

Similarly to the OR operation unit 54 shown in FIG. 7, the OR operation unit 54 shown in FIG. 12 performs an OR operation on directional plane features $b_1$ through $b_4$ output from the binarization unit 46 and stored in the storage unit 7, and outputs the operation results thereof as non-directional plane feature $b_{OR}$.

Similarly to the OR operation unit 55 shown in FIG. 8, the OR operation unit 55 shown in FIG. 12 performs an OR operation on registered directional plane feature $Tb_1$ through $Tb_4$ registered and stored in the storage unit 7 in advance, and outputs the operation results thereof as non-directional plane feature $Tb_{OR}$.

The directional plane feature matching process unit 53 obtains degrees of similarity between non-directional plane feature $b_{OR}$ and registered directional plane feature $Tb_4$ through $Tb_4$ registered and stored in the storage unit 7 in advance, and outputs these degrees of similarity as degrees of similarity $score_3$ through $score_6$.

The directional plane feature matching process unit 56 obtains degrees of similarity between registered non-directional plane feature $Tb_{OR}$ and directional plane features $b_1$ through $b_4$ output from the binarization unit 46 and stored in the storage unit 7, and outputs these degrees of similarity as degrees of similarity $score_7$ through $score_{10}$.

The score determination unit 6 weights $score_1$ through $score_{10}$ by constant $a_k$ or constant c as expressed by expression 15, and outputs the total of weighted $score_1$ through $score_{10}$ as score. Then, when for example score is equal to or greater than a threshold, the score determination unit 6 determines that the subject is a person to be authenticated.

$$\text{SCORE} := \sum_{1 \le k \le 10} a_k * score_k + c \quad \text{Expression 15}$$

This makes it possible to solve problems (8) and (9) below simultaneously.

Problem (8): When the quality of directional plane features $b_1$ through $b_4$ is not high, degrees of similarity $score_3$ through $score_6$ decrease significantly, lowering the robustness.

Problem (9): When a Wolf characteristic (a character that allows anyone to be authenticated in biometrics authentication) is included in registered directional plane features $Tb_1$ through $Tb_4$, the false acceptance rate increases in particular.

Non-directional plane feature $b_{OR}$ and registered non-directional plane feature $Tb_{OR}$ have more information than directional plane feature b or registered directional plane feature Tb, and accordingly even when the direction of the palm pattern in the palm region is slightly shifted from reference direction $\theta_r$, that shift can be easily corrected, making it possible to prevent a decrease in degrees of similarity $score_3$ through $score_{10}$ due to the shift. In other words, it is possible to increase the matching accuracy and to increase the authentication accuracy.

Seventh Embodiment

Next, explanations will be given for the biometrics authentication device 1 according to a seventh embodiment. Note that the configuration is similar to that of the first embodiment except for the matching process unit 5.

Figure 13:
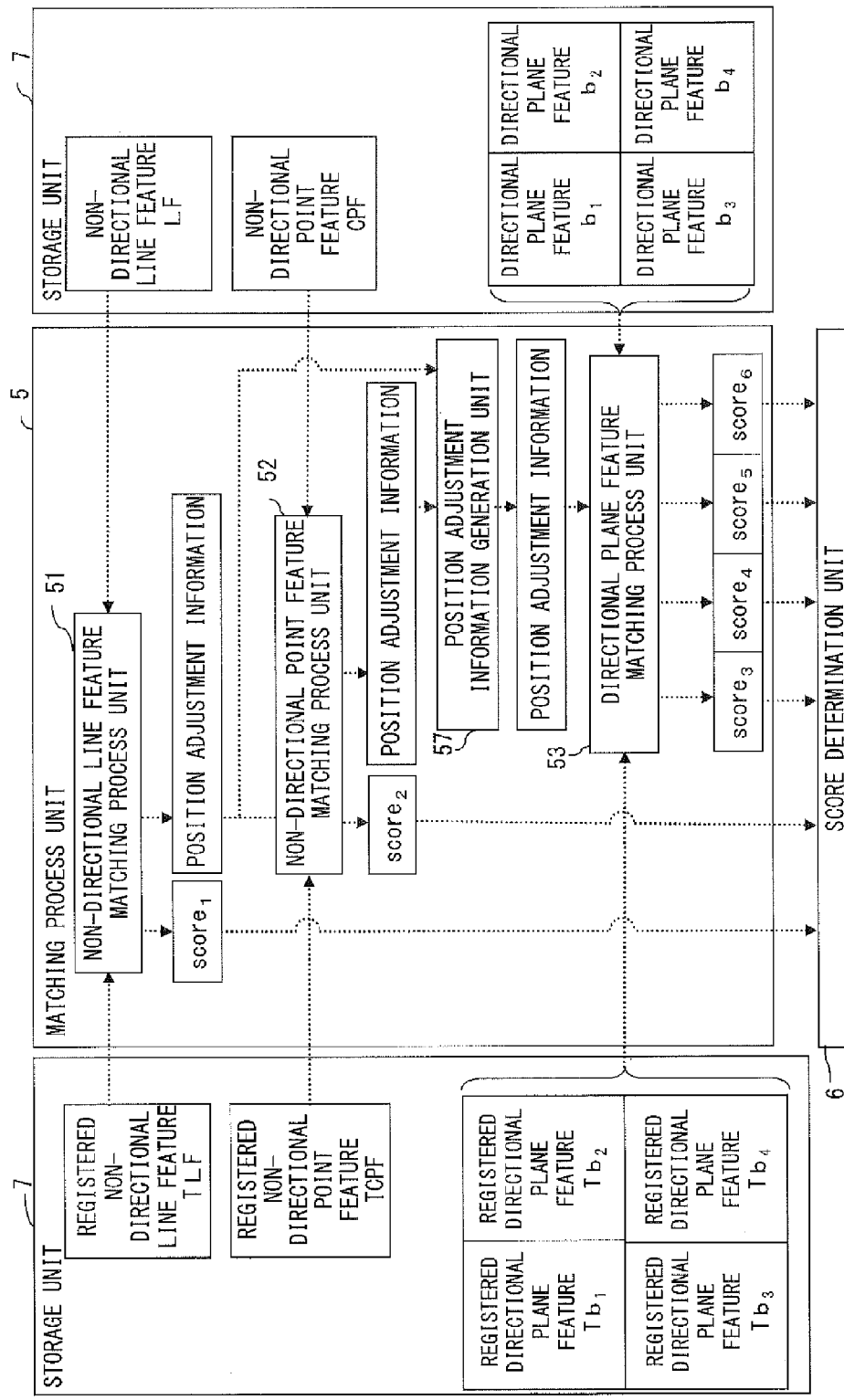
FIG. 13 shows an example of a matching process unit according to a seventh embodiment.

FIG. 13 shows an example of the matching process unit 5 according to the seventh embodiment. Note that constituents similar to those in the configuration shown in FIG. 5 are denoted by the same symbols and explanations thereof will be omitted.

The matching process unit 5 shown in FIG. 13 includes a position adjustment information generation unit 57 in addition to the non-directional line feature matching process unit 51, the non-directional point feature matching process unit 52, and the directional plane feature matching process unit 53.

The position adjustment information generation unit 57 generates position adjustment information used for a position adjustment process performed when degrees of similarity $score_3$ through $score_6$ are obtained by the directional plane feature matching process unit 53, by using position adjustment information obtained by a position adjustment process performed when degree of similarity $score_1$ is obtained by the non-directional line feature matching process unit 51 and by using position adjustment information obtained by a position adjustment process performed when degree of similarity score$_2$ is obtained by the non-directional point feature matching process unit 52.

The directional plane feature matching process unit 53 uses position adjustment information generated by the position adjustment information generation unit 57, as initial position adjustment information for a position adjustment process.

First, the position adjustment information generation unit 57 selects an evaluation function used for obtaining degrees of similarity score$_3$ through score$_6$ in the directional plane feature matching process unit 53 or an estimation function that can generate a result approximate to a result generated by the evaluation function (Step0.). When for example an evaluation function of a plane feature is used when degrees of similarity score$_3$ through score$_6$ are obtained in the directional plane feature matching process unit 53, the position adjustment information generation unit 57 selects a plane feature evaluation function or a line feature evaluation function.

Next, the position adjustment information generation unit 57 uses the evaluation function selected in Step0 so as to evaluate a plurality of pieces of position adjustment information (position adjustment information received from the non-directional line feature matching process unit 51 and position adjustment information received from the non-directional point feature matching process unit 52), and selects at least one piece of position adjustment information that results in the highest accuracy in the position adjustment process (Step1.).

Then, the position adjustment information generation unit 57 conducts fine adjustment on the position adjustment information obtained in Step1., and feeds the finely adjusted position adjustment information to the directional plane feature matching process unit 53 (Step2.). For example, the position adjustment information generation unit 57 adds information for cancelling a local shift having occurred in the position adjustment to the position adjustment information selected in Step1. or changes the position adjustment information itself selected in Step1. by using the Iterative Closest Point (ICP) Method or the block matching method.

As described above, by using position adjustment information obtained by the non-directional line feature matching process unit 51 and position adjustment information obtained by the non-directional point feature matching process unit 52, position adjustment information used for a position adjustment process of the directional plane feature matching process unit 53 is generated, and it is possible to generate degrees of similarity score$_3$ through score$_6$ between directional plane features b$_1$ through b$_4$ and registered directional plane features Tb$_1$ through Tb$_4$. In other words, it is possible to increase the matching accuracy and to increase the authentication accuracy.

Eighth Embodiment

Next, the biometrics authentication device 1 according to the eighth embodiment will be explained. Note that the configuration is similar to that of the first embodiment except for the feature extraction unit 4 and the matching process unit 5.

Figure 14:
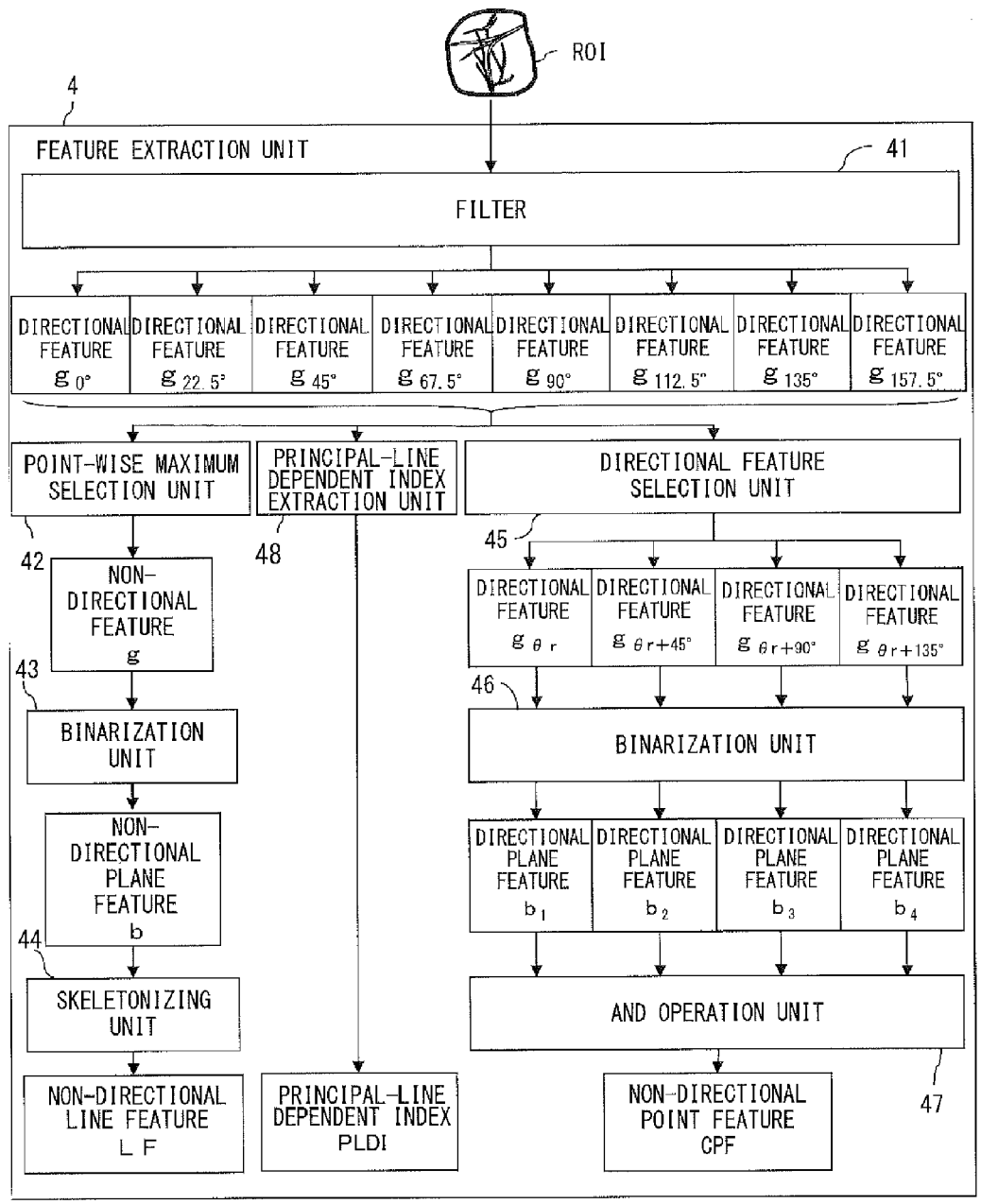
FIG. 14 shows an example of a feature extraction unit according to an eighth embodiment.

FIG. 14 shows an example of the feature extraction unit 4 according to the eighth embodiment. Note that constituents similar to those of the feature extraction unit 4 shown in FIG. 3 are denoted by the same symbols and explanations thereof will be omitted.

The feature extraction unit 4 shown in FIG. 14 includes a principal-line dependent index (PLDI) extraction unit 48 in addition to the filter 41, the point-wise maximum selection unit 42, the binarization unit 43, the skeletonizing unit 44, the directional feature selection unit 45, the binarization unit 46 and the AND operation unit 47.

The principal-line dependent index extraction unit 48 generates principal-line dependent index PLDI, which represents the degree of dependence of a principal line as a palm pattern in a palm region by respective directional features g$_\theta$ extracted from the filter 41. For example, from among respective directional features g$_\theta$(i,j) extracted from the filter 41, the principal-line dependent index extraction unit 48 selects maximum directional feature MAX(i,j). Also, from among respective directional features g$_\theta$(i,j) extracted from the filter 41, the principal-line dependent index extraction unit 48 selects minimum directional feature MIN(i,j). Also, the principal-line dependent index extraction unit 48 obtains average value AVE (i,j) of respective directional features g$_\theta$ extracted from the filter 41. Then, the principal-line dependent index extraction unit 48 treats, as principal-line dependent index PLDI(i,j), a result of dividing the difference between maximum directional feature MAX(i,j) and minimum directional feature MIN(i,j) by average value AVE(i,j).

Note that a method of obtaining principal-line dependent index PLDI is not limited to the above method.

Figure 15:
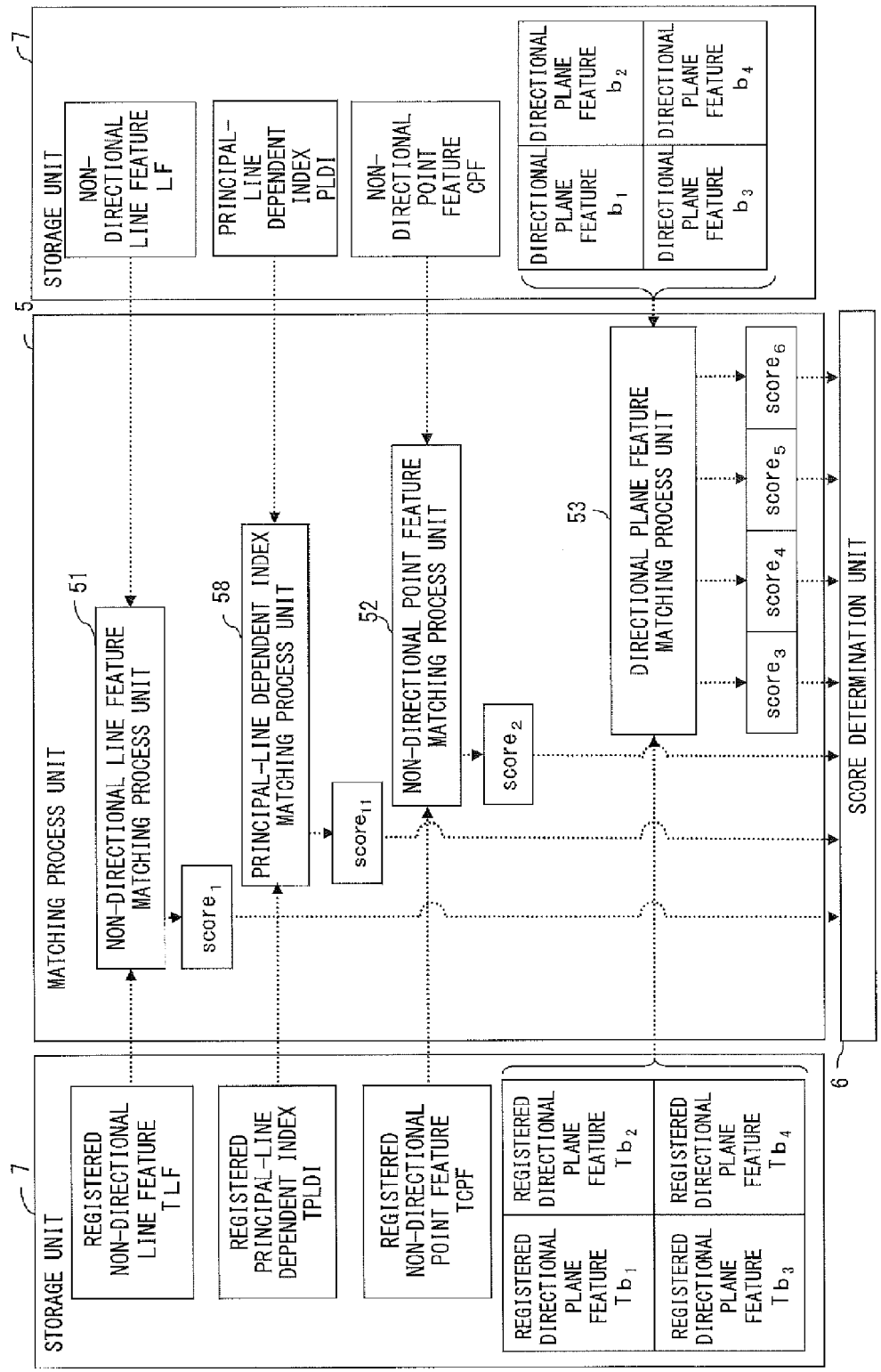
FIG. 15 shows an example of a matching process unit according to the eighth embodiment.

FIG. 15 shows an example of the matching process unit 5 according to the eighth embodiment. Note that constituents similar to those of the matching process unit 5 shown in FIG. 4 are denoted by the same symbols and explanations thereof will be omitted.

The matching process unit 5 shown in FIG. 15 includes a principal-line dependent index matching process unit 58 in addition to the non-directional line feature matching process unit 51, the non-directional point feature matching process unit 52 and the directional plane feature matching process unit 53.

The principal-line dependent index matching process unit 58 obtains degree of similarity score$_{11}$ between principal-line dependent index PLDI output from the principal-line dependent index extraction unit 48 and stored in the storage unit 7 and registered principal-line dependent index TPLDI stored in the storage unit 7 in advance.

Then, the greater degree of similarity score$_{11}$ is, the more the score determination unit 6 makes a weight corresponding to that degree of similarity score$_{11}$ smaller, and thereby the score determination unit 6 passively uses degree of similarity score$_{11}$.

As described above, by using degree of similarity score$_{11}$ passively, it is possible to determine whether or not the subject is a person to be authenticated, by suppressing an influence of a palm pattern, making it possible to increase the authentication accuracy. In other words, according to the biometrics authentication device 1 of the eighth embodiment, even when the method that physically separates a palm-pattern-representing feature from an image cannot be applied, an increase in the false acceptance rate can be prevented. Also, even when a non-directional line feature includes many palm patterns with heavy deposition of melanin particularly in the palm of the subject, it is possible to determine whether or not the subject is a person to be authenticated, by suppressing an influence of the palm patterns in that non-directional line feature, making it possible to decrease the false acceptance rate.

Ninth Embodiment

Next, the biometrics authentication device 1 according to a ninth embodiment will be explained. Note that the configuration is similar to that of the first embodiment except for the feature extraction unit 4.

FIG. 16 shows an example of the feature extraction unit 4 according to the ninth embodiment. Note that constituents similar to those in the configuration shown in FIG. 3 are denoted by the same symbols and explanations thereof will be omitted.

The feature extraction unit 4 shown in FIG. 16 includes a perpendicular filter 49 in addition to the filter 41, the point-wise maximum selection unit 42, the binarization unit 43, the skeletonizing unit 44, the directional feature selection unit 45, the binarization unit 46 and the AND operation unit 47.

From among respective directional features $g_\theta$ extracted from the filter 41, the perpendicular filter 49 decreases the luminance value of the entirety of directional feature $g_{0°}$ whose direction $\theta$ corresponds to 0° (directional feature $g_\theta$ of S (significant) feature), increases the luminance value of the entirety of directional feature $g_{90°}$ corresponding to the direction perpendicular to directional feature $g_\theta$ of that S feature (directional feature $g_\theta$ of P (Perpendicular) feature), and outputs other directional features $g_\theta$ as they are.

The point-wise maximum selection unit 42 performs the operation expressed by expression 1 above on each directional feature $g_\theta$ output from the perpendicular filter 49, and outputs non-directional feature g.

The binarization unit 43 performs a binarization process on non-directional features g output from the point-wise maximum selection unit 42, and outputs non-directional plane feature b as the process results thereof.

The skeletonizing unit 44 performs a skeletonizing process on non-directional plane feature b output from the binarization unit 43, and outputs non-directional line feature LF as the process result thereof.

When for example the direction perpendicular to the longitudinal direction of the subject's hand is 0°, palm patterns are made mainly of wrinkles made when the hand is clasped, and therefore direction $\theta$ corresponding to directional feature $g_\theta$ that is estimated to include many palm patterns is 0°. Accordingly, directional feature $g_\theta$ of an S feature is directional feature $g_\theta$ in which palm patterns are emphasized in the palm region and non-directional line feature LF generated by using directional feature $g_\theta$ of an S feature whose entire luminance value has been decreased is one with reduced influence of palm patterns. This makes it possible to determine whether or not the subject is a person to be authenticated, by suppressing an influence of palm patterns, and thereby to improve the authentication accuracy. In other words, according to the biometrics authentication device 1 of the ninth embodiment, even when the method that physically separates a palm-pattern-representing feature from an image cannot be applied, an increase in the false acceptance rate can be prevented. Also, even when a non-directional line feature LF includes many palm patterns with heavy deposition of melanin particularly in the palm of the subject, it is possible to determine whether or not the subject is a person to be authenticated, by suppressing an influence of the palm patterns in that non-directional line feature LF, making it possible to decrease the false acceptance rate.

Also, when the longitudinal direction of the hand of the subject is 90°, veins extend mainly in the directions of the fingers from the wrist and accordingly direction $\theta$ corresponding to directional feature $g_\theta$ estimated to include many veins is 90°. Accordingly, directional feature $g_\theta$ of a P feature is directional feature $g_\theta$ in which veins are emphasized in the palm region and non-directional line feature LF generated by using directional feature $g_\theta$ of a P feature whose entire luminance value has been increased is one with emphasized veins. This makes it possible to determine whether or not the subject is a person to be authenticated, by emphasizing veins, which have greater variation than palm patterns, and thereby to decrease the false rejection rate.

Tenth Embodiment

Next, the biometrics authentication device 1 according to the tenth embodiment will be explained. Note that the configuration is similar to that of the first embodiment except for the matching process unit 5.

Figure 17:
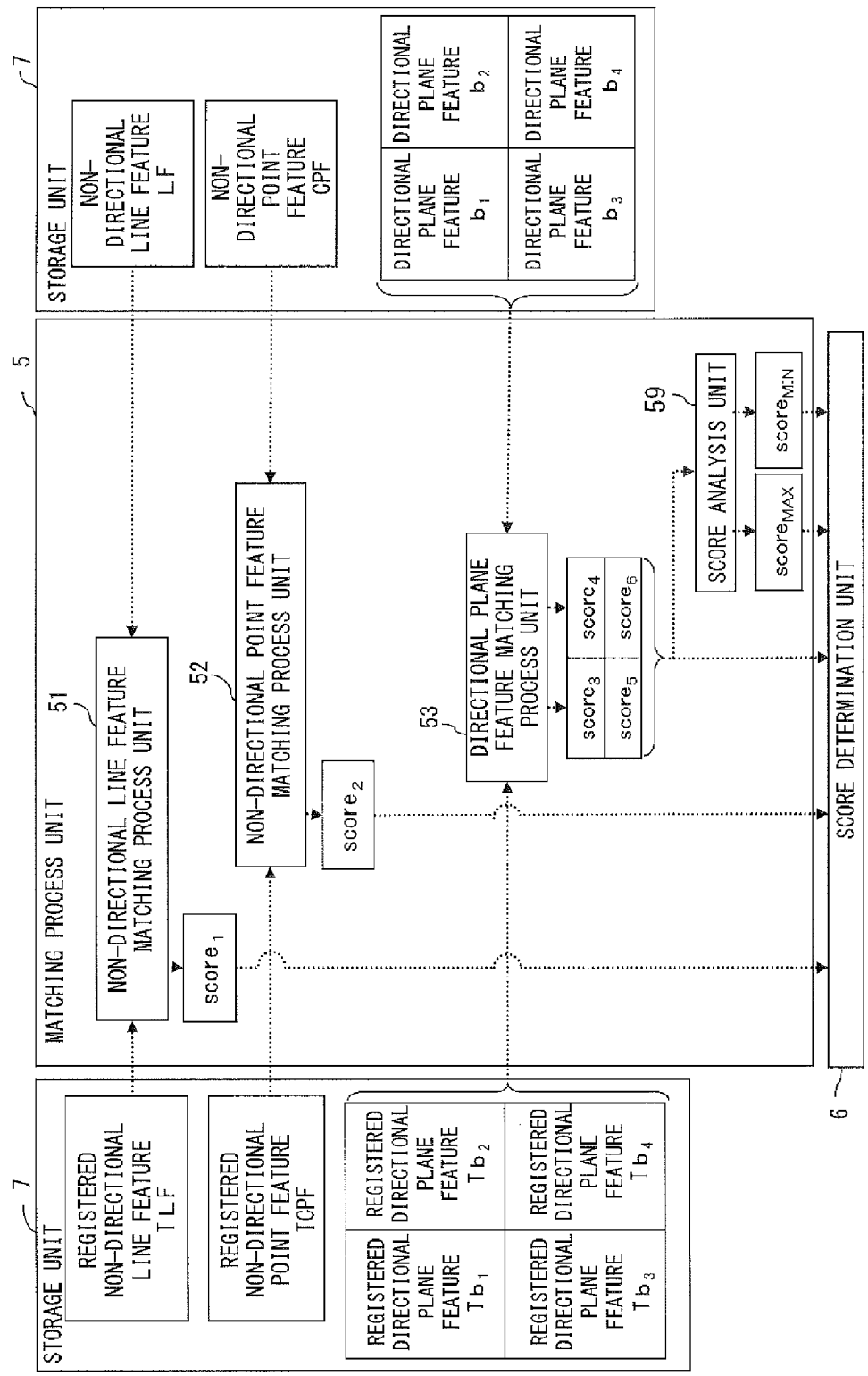
FIG. 17 shows an example of a matching process unit according to a tenth embodiment.

FIG. 17 shows an example of the matching process unit 5 according to the tenth embodiment. Note that constituents similar to those in the configuration shown in FIG. 4 are denoted by the same symbols and explanations thereof will be omitted.

The matching process unit 5 shown in FIG. 17 includes a score analysis unit 59 in addition to the non-directional line feature matching process unit 51, the non-directional point feature matching process unit 52, and the directional plane feature matching process unit 53.

From among degrees of similarity $score_3$ through $score_6$ output from the directional plane feature matching process unit 53, the score analysis unit 59 outputs degree of similarity $score_3$ corresponding to directional plane feature bias score $score_{MAX}$ and also outputs degree of similarity $score_5$ corresponding to directional plane feature $b_3$ as $score_{MIN}$.

The score determination unit 6 passively uses $score_{MAX}$, and uses $score_{MIN}$ actively.

Directional plane feature $b_3$ is a directional plane feature b that tends to include many palm patterns, and accordingly by passively using degree of similarity score $score_{MAX}$ corresponding to that directional plane feature $b_3$, it is possible to determine whether or not the subject is a person to be authenticated with suppressed influence of the palm patterns, and thereby to increase the authentication accuracy. In other words, according to the biometrics authentication device 1 of the ten embodiment, even when the method that physically separates a palm-pattern-representing feature from an image cannot be applied, an increase in the false acceptance rate can be prevented. Also, even when a non-directional line feature LF includes many palm patterns with heavy deposition of melanin particularly in the palm of the subject, it is possible to determine whether or not the subject is a person to be authenticated, by suppressing an influence of the palm patterns in that non-directional line feature LF, making it possible to decrease the false acceptance rate.

Directional plane feature $b_5$ is a directional plane feature b that tends to include many veins, and accordingly, by positively using degree of similarity $score_{MIN}$ corresponding to directional plane feature $b_5$, it is possible to determine whether or not the subject is a person to be authenticated, by emphasizing veins, which have greater variation than palm patterns, and thereby to decrease the false rejection rate.

Note that it is also possible to employ a configuration in which the principal-line dependent index extraction unit 48 according to the eighth embodiment is included in the biometrics authentication device 1 according to the tenth embodiment so that the greater principal-line dependent index PLDI is, the more passively degree of similarity score$_{MAX}$ is used.

Eleventh Embodiment

Next, explanations will be given for the biometrics authentication device 1 according to an eleventh embodiment. Note that the configuration is similar to that of the first embodiment except for the feature extraction unit 4.

Figure 18:
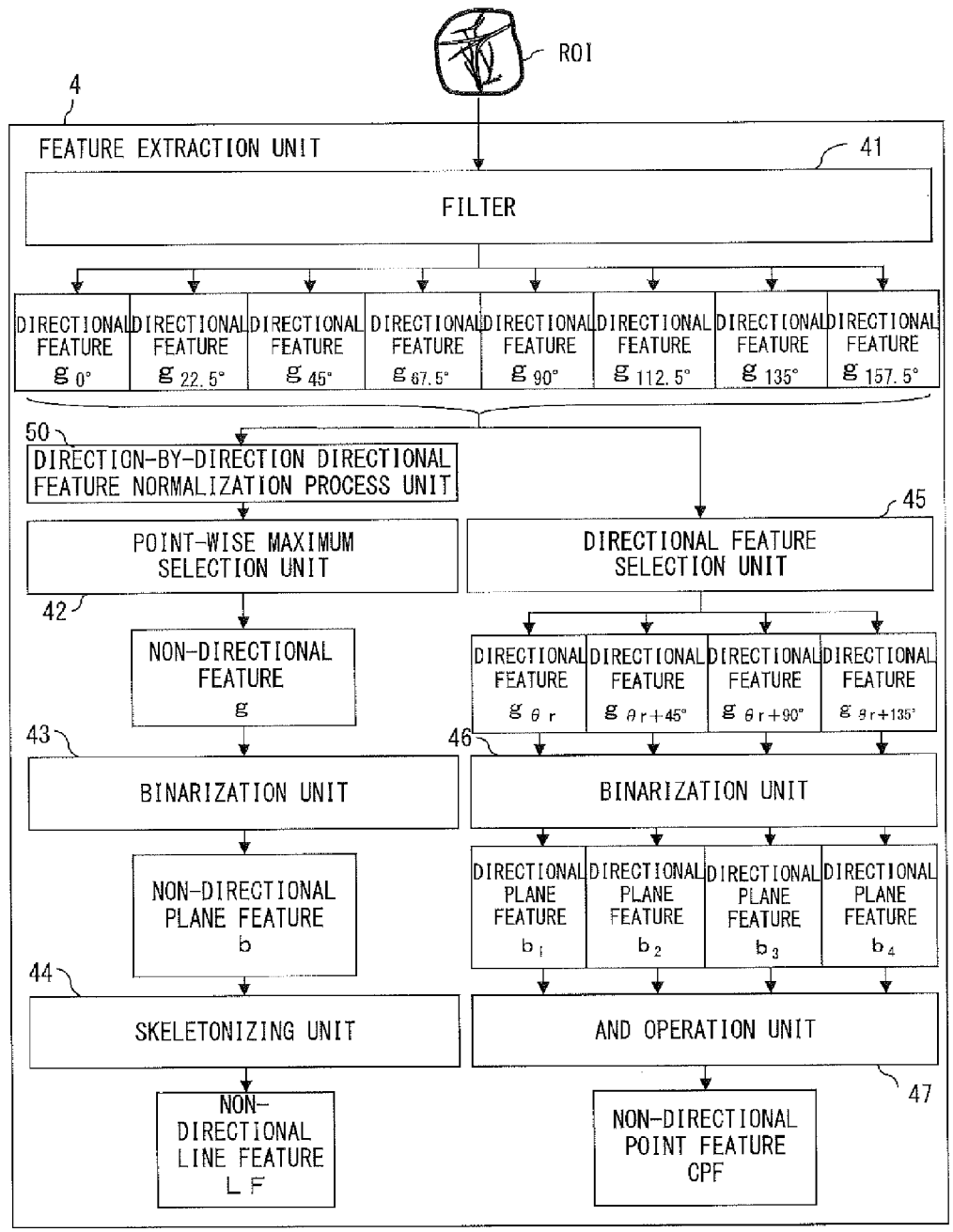
FIG. 18 shows an example of a feature extraction unit according to an eleventh embodiment.

FIG. 18 shows an example of the feature extraction unit 4 according to the eleventh embodiment. Note that constituents similar to those in the configuration shown in FIG. 3 are denoted by the same symbols and explanations thereof will be omitted.

The feature extraction unit 4 shown in FIG. 18 includes a direction-by-direction directional feature normalization process unit 50 in addition to the filter 41, the point-wise maximum selection unit 42, the binarization unit 43, the skeletonizing unit 44, the directional feature selection unit 45, the binarization unit 46 and the AND operation unit 47.

The direction-by-direction directional feature normalization process unit 50 conducts normalization on each directional feature $g_\theta$ extracted from the filter 41.

The point-wise maximum selection unit 42 conducts an operation as expressed by expression 1 on each directional feature $g_\theta$ that received the normalization from the direction-by-direction directional feature normalization process unit 50, and outputs non-directional feature g.

The binarization unit 43 conducts a binarization process on non-directional feature g output from the point-wise maximum selection unit 42, and outputs non-directional plane feature b as the process result thereof.

The skeletonizing unit 44 conducts a skeletonizing process on non-directional plane feature b output from the binarization unit 43, and outputs non-directional line feature LF as the process result thereof.

A luminance value corresponding to a palm pattern tends to be greater than a luminance value corresponding to a vein. Accordingly, when normalization is conducted on each directional feature $g_\theta$ extracted from the filter 41, a luminance value corresponding to a palm pattern becomes smaller than a luminance value corresponding to a vein in each directional feature $g_\theta$. Also, non-directional line feature LF generated by using each directional feature $g_\theta$ that received normalization is one with a reduced palm pattern influence. This makes it possible to determine whether or not the subject is a person to be authenticated, by suppressing the influence of a palm pattern, and thereby to increase the authentication accuracy. In other words, according to the biometrics authentication device 1 according to the eleventh embodiment, an increase in the false acceptance rate can be suppressed even when the method that physically separates a palm-pattern-representing feature from an image cannot be applied. Also, when a non-directional line feature LF includes many palm patterns with heavy deposition of melanin particularly in the palm of the subject, it is possible to determine whether or not the subject is a person to be authenticated, by suppressing the influence of the palm patterns in that non-directional line feature LF, making it possible to decrease the false acceptance rate.

Also, when normalization is conducted on each directional feature $g_\theta$ extracted from the filter 41, a luminance value corresponding to a vein becomes greater than a luminance value corresponding to a palm pattern in each directional feature $g_\theta$. Also, non-directional line feature LF generated by using each normalized directional feature $g_\theta$ has its vein emphasized. This makes it possible to determine whether or not the subject is a person to be authenticated, by emphasizing veins, which have greater variation than palm patterns, and thereby to decrease the false rejection rate.

Twelfth Embodiment

Next, explanations will be given for the biometrics authentication device 1 according to a twelfth embodiment.

FIG. 19 shows an example of the biometrics authentication device 1 according to the twelfth embodiment. Note that constituents similar to those in the configuration shown in FIG. 1 are denoted by the same symbols and explanations thereof will be omitted.

The biometrics authentication device 1 shown in FIG. 19 includes a noise removal process unit 13 in addition to the image obtainment unit 2, the region identifying unit 3, the feature extraction unit 4, the matching process unit 5, the score determination unit 6 and the storage unit 7.

The noise removal process unit 13 conducts a noise removal process on a palm region image. For example, the noise removal process unit 13 conducts a noise removal process utilizing wavelet transform on the palm region image. "S. D. Ruikar, D. D. Doye, "Wavelet Based Image Denoising Technique," IJACSA, vol. 2, no. 3, March 2011." is to be referred to.

The feature extraction unit 4 generates non-directional features (non-directional line feature LF and non-directional point feature CPF) and directional features (directional plane features $b_1$ through $b_4$) from palm region image f from which noise has been removed by the noise removal process unit 13.

As described above, a non-directional feature and a directional feature can be generated from palm region image f from which noise has been removed, making it possible to increase the authentication accuracy.

Thirteenth Embodiment

Next, explanations will be given for the biometrics authentication device 1 according to a thirteenth embodiment.

Figure 20:
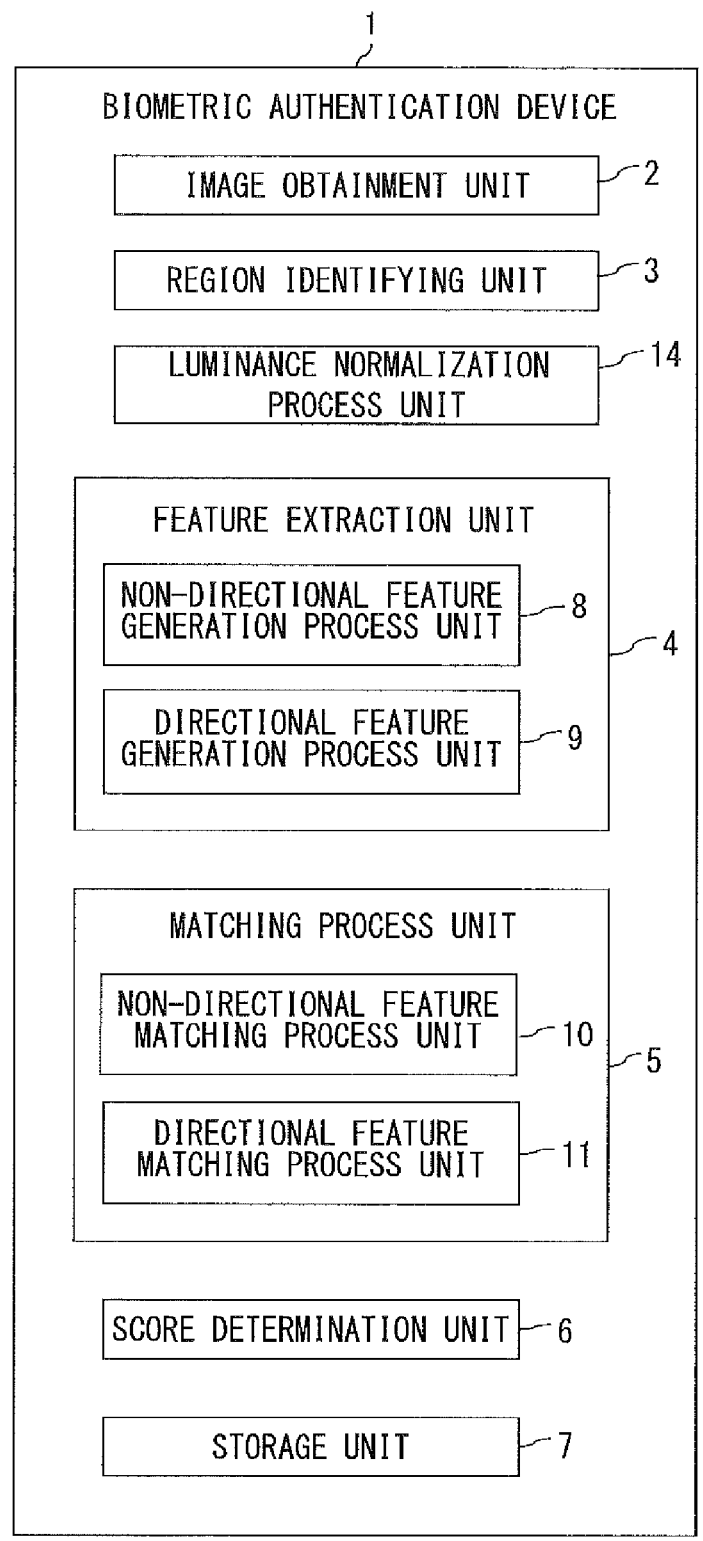
FIG. 20 shows an example of a biometrics authentication device according to a thirteenth embodiment.

FIG. 20 shows an example of the biometrics authentication device 1 according to the thirteenth embodiment. Note that constituents similar to those in the configuration shown in FIG. 1 are denoted by the same symbols and explanations thereof will be omitted.

The biometrics authentication device 1 shown in FIG. 20 includes a luminance normalization process unit 14 in addition to the image obtainment unit 2, the region identifying unit 3, the feature extraction unit 4, the matching process unit 5, the score determination unit 6 and the storage unit 7.

The luminance normalization process unit 14 conducts luminance normalization on palm region image f.

The feature extraction unit 4 generates non-directional features (non-directional line feature LF and non-directional point feature CPF) and directional features (directional plane features $b_1$ through $b_4$) from palm region image f that received luminance normalization from the luminance normalization process unit 14.

As described above, it is possible to generate a non-directional feature and a directional feature from palm region image f from which noise (too high a luminance value or too low a luminance value) has been removed making it possible to increase the authentication accuracy.

Fourteenth Embodiment

Next, explanations will be given for the biometrics authentication device 1 according to a fourteenth embodiment.

Figure 21:
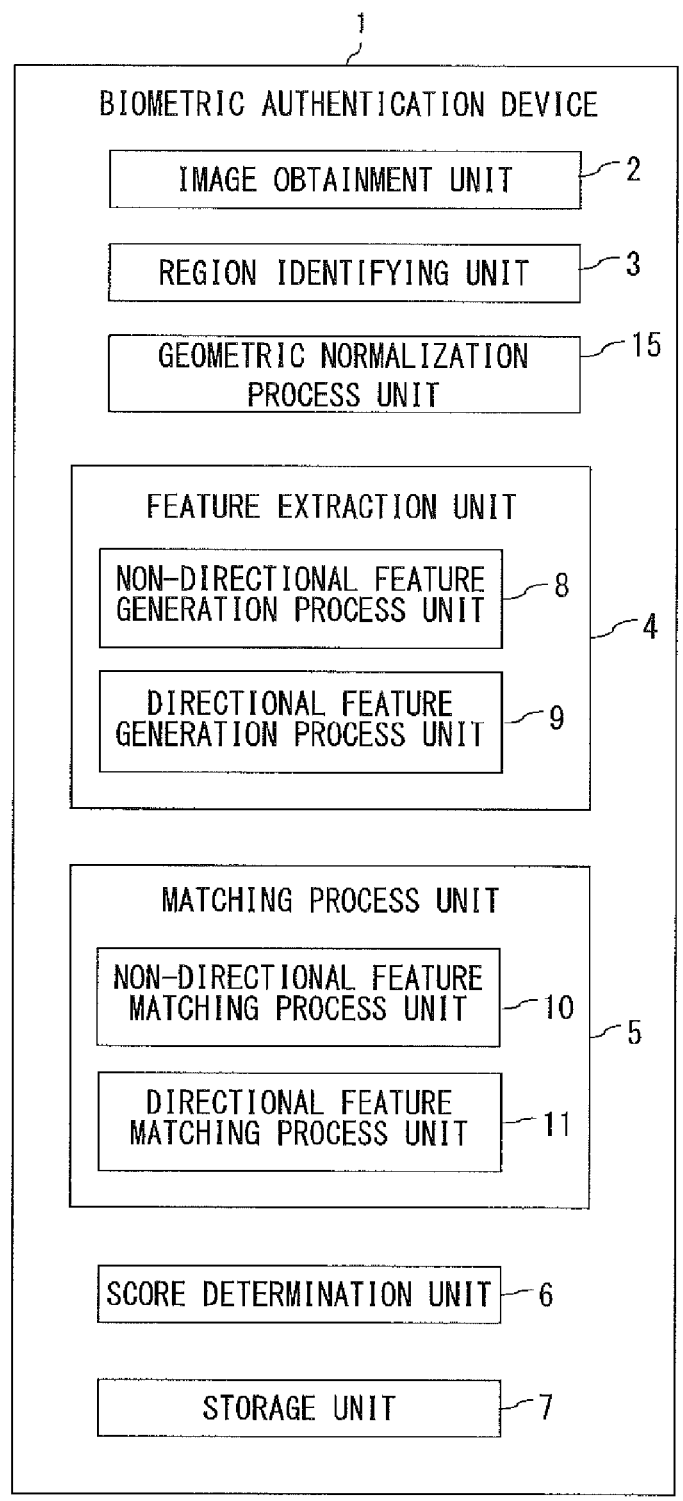
FIG. 21 shows an example of a biometrics authentication device according to a fourteenth embodiment.

FIG. 21 shows an example of the biometrics authentication device 1 according to the fourteenth embodiment. Note that constituents similar to those in the configuration shown in FIG. 1 are denoted by the same symbols and explanations thereof will be omitted.

The biometrics authentication device 1 shown in FIG. 21 includes a geometric normalization process unit 15 in addition to the image obtainment unit 2, the region identifying unit 3, the feature extraction unit 4, the matching process unit 5, the score determination unit 6 and the storage unit 7.

The geometric normalization process unit 15 conducts geometric normalization on palm region image f.

The feature extraction unit 4 generates non-directional features (non-directional line feature LF and non-directional point feature CPF) and directional features (directional plane features $b_1$ through $b_4$) from palm region image f that received geometric normalization by the geometric normalization process unit 15.

As described above, it is possible to generate a non-directional feature and a directional feature from palm region image f that received geometric normalization, making it possible to increase the authentication accuracy.

Fifteenth Embodiment

Next, explanations will be given for the biometrics authentication device 1 according to a fifteenth embodiment.

Figure 22:
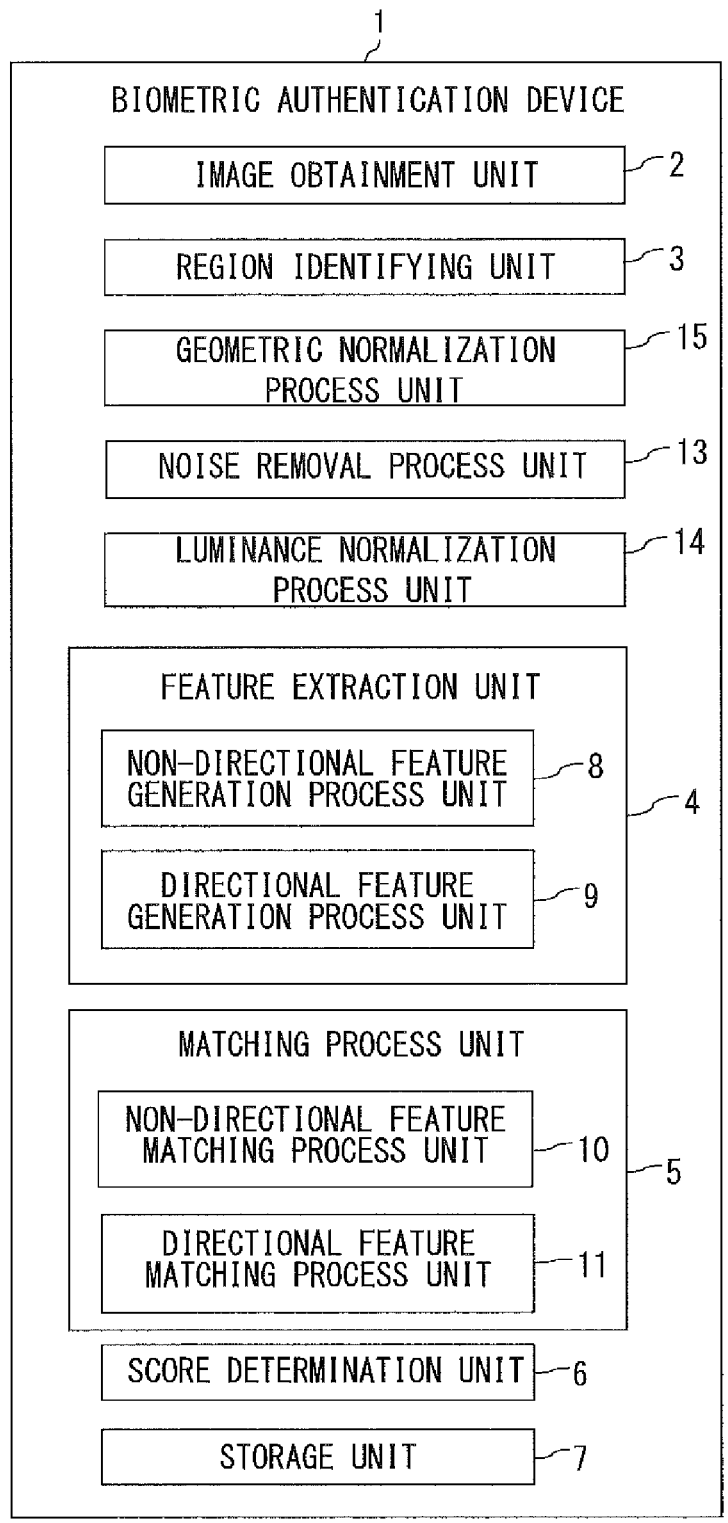
FIG. 22 shows an example of a biometrics authentication device according to a fifteenth embodiment.

FIG. 22 shows an example of the biometrics authentication device 1 according to the fifteenth embodiment. Note that constituents similar to those in the configuration shown in FIG. 1, FIG. 19, FIG. 20 and FIG. 21 are denoted by the same symbols and explanations thereof will be omitted.

The biometrics authentication device 1 shown in FIG. 22 includes the noise removal process unit 13 according to the twelfth embodiment, the luminance normalization process unit 14 according to the thirteenth embodiment, and the geometric normalization process unit 15 according to the fourteenth embodiment in addition to the image obtainment unit 2, the region identifying unit 3, the feature extraction unit 4, the matching process unit 5, the score determination unit 6 and the storage unit 7 according to the first embodiment.

Figure 23:
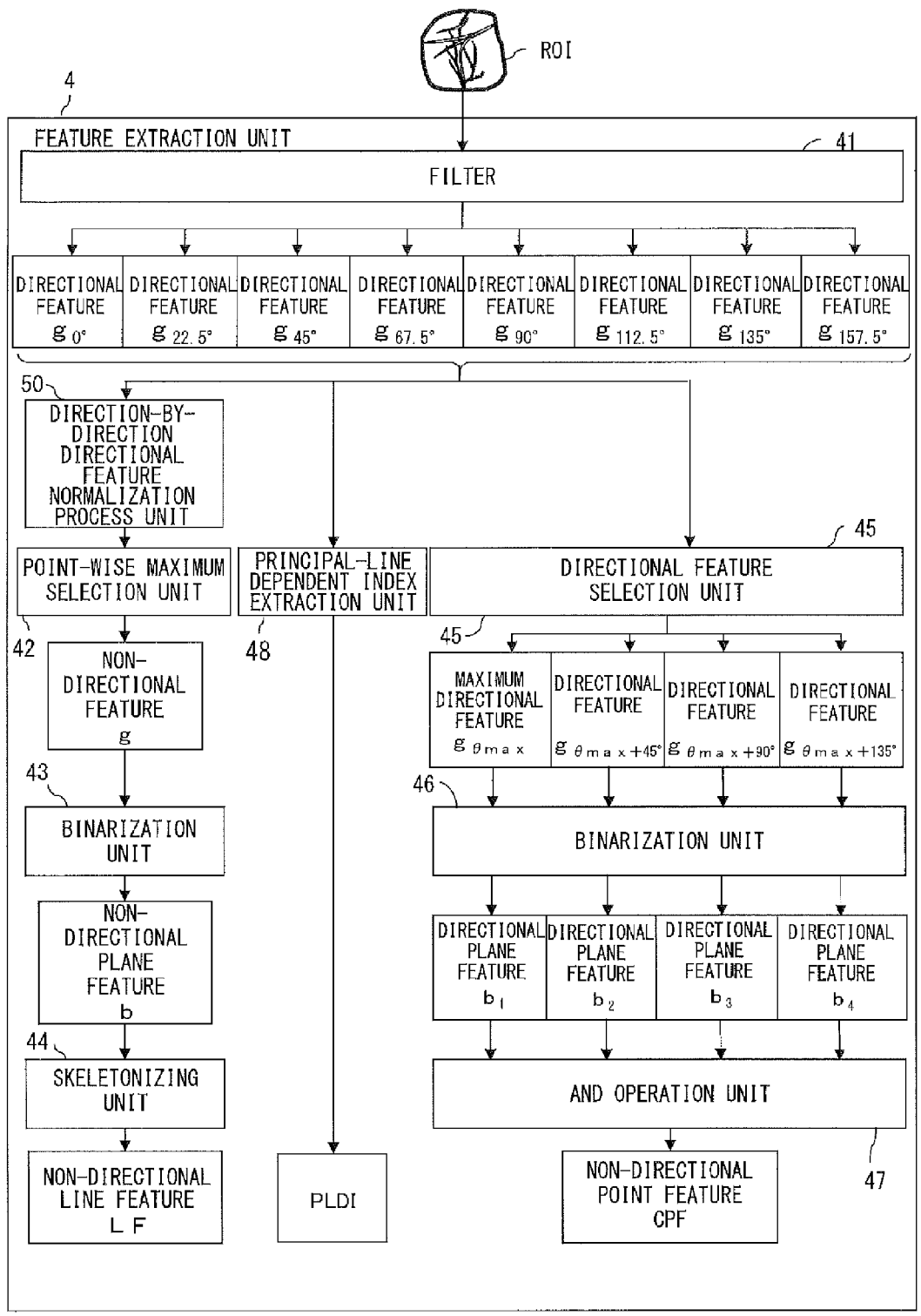
FIG. 23 shows an example of a feature extraction unit according to the fifteenth embodiment.

FIG. 23 shows an example of the feature extraction unit 4 according to the fifteenth embodiment. Note that constituents similar to those in the configuration shown in FIG. 3, FIG. 6, FIG. 14 and FIG. 18 are denoted by the same symbols and explanations thereof will be omitted.

The feature extraction unit 4 shown in FIG. 23 includes the principal-line dependent index extraction unit 48 according to the eighth embodiment and the direction-by-direction directional feature normalization process unit 50 according to the eleventh embodiment, in addition to the filter 41, the point-wise maximum selection unit 42, the binarization unit 43, the skeletonizing unit 44, the directional feature selection unit 45, the binarization unit 46 and the AND operation unit 47 according to the first embodiment.

Figure 24:
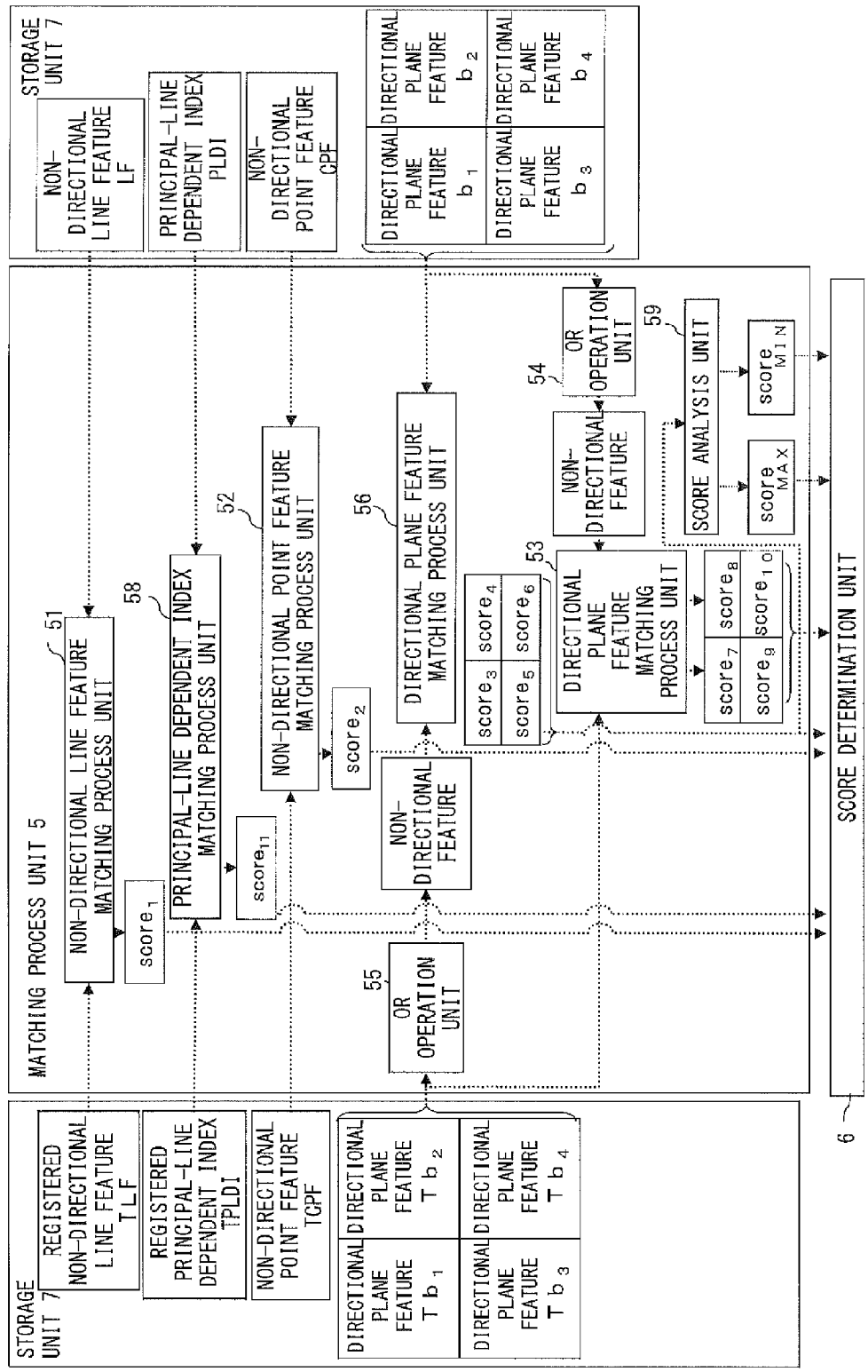
FIG. 24 shows an example of a matching process unit according to the fifteenth embodiment.

FIG. 24 shows an example of the matching process unit 5 according to the fifteenth embodiment. Note that constituents similar to those in the configuration shown in FIG. 4, FIG. 5, FIG. 12, FIG. 15 and FIG. 17 are denoted by the same symbols and explanations thereof will be omitted.

The matching process unit 5 shown in FIG. 24 includes the OR operation unit 54, the OR operation unit 55 and the directional plane feature matching process unit 56 according to the sixth embodiment, the principal-line dependent index matching process unit 58 according to the eighth embodiment, and the score analysis unit 59 according to the tenth embodiment, in addition to the non-directional line feature matching process unit 51, the non-directional point feature matching process unit 52, and the directional plane feature matching process unit 53 according to the first and second embodiments.

As described above, by combining various embodiments, it is possible to increase the effects of the respective embodiments in a multiplex manner.

Note that combinations of respective embodiments are not limited to combinations of the fifteenth embodiment, and various combinations are possible.

FIG. 25 shows an example of a hardware configuration that constitutes the biometrics authentication device 1 of embodiments of the present disclosure.

As shown in FIG. 25, the hardware constituting the biometrics authentication device 1 includes a control unit 1201, a storage unit 1202, a recording medium reading device 1203, an input/output interface 1204, and a communication interface 1205, all of which are connected to each other via a bus 1206. Note that the hardware constituting the biometrics authentication device 1 may be implemented by cloud technology etc.

The control unit 1201 may be implemented by for example a central processing unit (CPU), a multi-core CPU, a programmable device (field programmable gate array (FPGA), a programmable logic device (PLD), etc.), and corresponds to the region identifying unit 3, the feature extraction unit 4, the matching process unit 5 and the score determination unit 6 shown in FIG. 1, the data process unit 12 shown in FIG. 9, the noise removal process unit 13 shown in FIG. 19, the luminance normalization process unit 14 shown in FIG. 20 and the geometric normalization process unit 15 shown in FIG. 21.

The storage unit 1202 corresponds to the storage unit 7 shown in FIG. 1, FIG. 9, FIG. 19, FIG. 20 and FIG. 21, and may be implemented by for example a memory such as a read only memory (ROM), a random access memory (RAM), a hard disk, etc. Note that the storage unit 1202 may be used as a working area for execution. Also, another storage unit may be provided outside the biometrics authentication device 1.

The recording medium reading device 1203 reads data stored in a recording medium 1207 and writes data to the recording medium 1207 under control of the control unit 1201. Also, the recording medium 1207, which is removable, is a computer-readable non-transitory recording medium, and may be implemented by a magnetic recording device, an optical disk, a magneto-optical recording medium, a semiconductor memory, etc. A magnetic recording device may be implemented by for example a hard disk device (HDD) etc. An optical disk may be implemented by for example a digital versatile disk (DVD), a DVD-RAM, a compact disk read only memory (CD-ROM), a CD-R (Recordable)/RW (ReWritable), etc. A magneto-optical recording medium may be implemented by for example a magneto-optical (MO) disk etc. Also, a non-transitory recording medium includes the storage unit 1202.

To the input/output interface 1204, an input/output unit 1208 is connected, and the input/output interface 1204 transmits, to the control unit 1201 and via the bus 1206, information input by the user via the input/output unit 1208.

Also, the input/output interface 1204 transmits, to the input/output unit 1208 and via the bus 1206, information transmitted from the control unit 1201.

The input/output unit 1208 corresponds to the image obtainment unit 2 shown in FIG. 1, FIG. 9, FIG. 19, FIG. 20 and FIG. 21, and may be implemented by for example an image pickup device etc. Also, the input/output unit 1208 may be implemented by for example a keyboard, a pointing device (mouse etc.), a touch panel, a cathode ray tube (CRT) display, a printer, etc.

The communication interface 1205 is an interface for providing connection to a local area network (LAN) or to the Internet. Also, the communication interface 1205 can be used as an interface for providing LAN connection, Internet connection, or wireless connection to other computers.

By using a computer having the above hardware, the respective process functions performed by the biometrics authentication device 1 are implemented. In such a case, by making a computer execute a program describing the contents of the respective process functions performed by the biometrics authentication device 1, the above respective functions (for example, the region identifying unit 3, the feature extraction unit 4, the matching process unit 5, the score determination unit 6, the data process unit 12, the noise removal process unit 13, the luminance normalization process unit 14 and the geometric normalization process unit 15) are implemented on the computer. The program describing the contents of the respective process functions can be stored in the storage unit 1202 or the recording medium 1207.

When the program is to be distributed, the recording medium 1207, such as a DVD, a CD-ROM, etc., that has recorded that program therein is sold. It is also possible to record the program in a storage device of a server computer so that the program is transferred to another computer from the server computer via a network.

The computer that executes the program for example stores, in the storage unit 1202, the program recorded in the recording medium 1207 or the program transferred from the server computer. Then, the computer reads the program from the storage unit 1202 so as to execute a process in accordance with the program. Note that the computer may also read the program directly from the recording medium 1207 so as to execute a process in accordance with the program. Also, the computer may execute a process in accordance with a received program each time the program is transferred from the server program.

In the embodiments of the present disclosure, an image processing device that conducts authentication by using a palm vein has been used for the explanations, whereas the scope of the present disclosure is not limited to this and any other portions from which biological features can be detected can be used.

For example, other portions from which biological features can be detected are not limited to veins, and may be a biological blood vessel image, a biological pattern, a biological fingerprint or palm pattern, the bottom of a foot, a toe, a finger, the back of a hand, the top of a foot, a wrist, an arm, etc.

Note that when a vein is used for the authentication, other portions from which biological features can be detected may be any portion that allows the observation of the vein.

Note that portions from which biological features can be detected and which can identify biological information are advantageous for authentication. For example, the back of a hand or a face allows the identifying of the portion from the obtained image. Also, the above embodiments allow various changes within the spirit of the embodiments. Further, the above embodiments allow those skilled in the art to conduct various modifications/alterations, and the scope of the present disclosure is not limited to the exact configurations or application examples that were explained.

The embodiments of the present disclosure can suppress an increase in a false acceptance rate even when methods that physically separate a palm-pattern-representing feature from an image cannot be applied.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometrics authentication device comprising:
   a non-directional feature generation process unit configured to extract, from an input image, directional features corresponding to directions different from each other and to generate a non-directional feature on the basis of the directional features;
   a directional feature generation process unit configured to extract, from the input image, directional features corresponding to directions different from each other and to select, from among the directional features, a reference directional feature corresponding to a reference direction;
   a non-directional feature matching process unit configured to obtain a first degree of similarity between the non-directional feature and a registered non-directional feature stored in a storage unit;
   a directional feature matching process unit configured to obtain a second degree of similarity between the reference directional feature and a registered reference directional feature stored in the storage unit; and
   a determination unit configured to make a weight of the second degree of similarity smaller than a weight of the first degree of similarity and to determine whether or not a subject is a person to be authenticated, by using the first degree of similarity and the second degree of similarity;
   wherein the operations of the non-directional feature generation process unit, the directional feature generation process unit, the non-directional feature matching process unit, the directional feature matching process unit and the determination unit are performed by a computer.

2. The biometrics authentication device according to claim 1, wherein
   the directional feature generation process unit extracts, from the image, directional features corresponding to directions different from each other and selects, from among the directional features, a relative directional feature corresponding to a relative direction with respect to the reference direction,
   the directional feature matching process unit obtains a third degree of similarity between the relative directional feature and a registered relative directional feature stored in the storage unit, and the determination unit makes a weight of the third degree of similarity greater than the weight of the first degree of similarity and determines whether or not a subject is a person to be authenticated, by using the third degree of similarity.

3. The biometrics authentication device according to claim 2, comprising:
   an AND operation unit configured to perform an AND operation on the reference directional feature and the relative directional feature and to treat an operation result thereof as a non-directional point feature; and
   a non-directional point feature matching process unit configured to obtain a fourth degree of similarity between the non-directional point feature and a registered non-directional point feature stored in the storage unit, wherein
   the determination unit determines whether or not a subject is a person to be authenticated, by using the fourth degree of similarity; and
   wherein further the operations of the AND operation unit and the non-directional point feature matching process unit are performed by the computer.

4. The biometrics authentication device according to claim 3, comprising:
   a position adjustment information generation unit configured to generate position adjustment information by using position adjustment information used for a position adjustment process between the non-directional feature and the registered non-directional feature performed by the non-directional feature matching process unit for obtaining the first degree of similarity and position adjustment information used for a position adjustment process between the non-directional point feature and the registered non-directional point feature performed by the non-directional point feature matching process unit for obtaining the fourth degree of similarity, wherein
   the directional feature matching process unit performs, for obtaining the second degree of similarity, a position adjustment process between the reference directional feature and the registered reference directional feature by using position adjustment information generated by the position adjustment information generation unit; and
   wherein further operation of the position adjustment information generation unit is performed by the computer.

5. The biometrics authentication device according to claim 2, comprising:
   an OR operation unit configured to perform an OR operation on a reference directional feature and a relative directional feature output from the directional feature generation process unit so as to treat an operation result thereof as a non-directional plane feature or to perform an OR operation on a registered reference directional feature and a registered relative directional feature stored in the storage unit so as to treat an operation result thereof as a registered non-directional plane feature, wherein
   the directional feature matching process unit treats, as the second degree of similarity, a degree of similarity between the non-directional plane feature and the registered reference directional feature while treating, as the third degree of similarity, a degree of similarity between the non-directional plane feature and the registered relative directional feature or treats, as the second degree of similarity, a degree of similarity between the reference directional feature and the registered non-directional plane feature while treating, as the third degree of similarity, a degree of similarity between the relative directional feature and the registered non-directional plane feature; and
   wherein further operation of the OR operation unit is performed by the computer.

6. The biometrics authentication device according to claim 2, wherein
   the directional feature matching process unit includes:
      a first OR operation unit configured to perform an OR operation on a reference directional feature and a relative directional feature output from the directional feature generation process unit so as to treat an operation result thereof as a non-directional plane feature;
      a second OR operation unit configured to perform an OR operation on a registered reference directional feature and a registered relative directional feature stored in the storage unit so as to treat an operation result thereof as a registered non-directional plane feature;
      a first directional feature matching process unit configured to treat, as the second degree of similarity, a degree of similarity between the non-directional plane feature and the registered reference directional feature and to treat, as the third degree of similarity, a degree of similarity between the non-directional plane feature and the registered relative directional feature; and
      a second directional feature matching process unit configured to treat, as a fifth degree of similarity, a degree of similarity between the reference directional feature and the registered non-directional plane feature and to treat, as a sixth degree of similarity, a degree of similarity between the relative directional feature and the registered non-directional plane feature, wherein
   the determination unit determines whether or not a subject is a person to be authenticated, by using the second and third degrees of similarity and the fifth and sixth degrees of similarity.

7. The biometrics authentication device according to claim 1, wherein
   the directional feature matching process unit performs, for obtaining the second degree of similarity, a position adjustment process between the reference directional feature and the registered reference directional feature by using position adjustment information used for a position adjustment process between the non-directional feature and the registered non-directional feature performed by the non-directional feature matching process unit for obtaining the first degree of similarity.

8. The biometrics authentication device according to claim 1, wherein
   the directional feature generation process unit defines, as the reference direction, a direction corresponding to the directional feature that results in maximum filter output energy, from among a plurality of directional features extracted from the image.

9. The biometrics authentication device according to claim 1, comprising:
   a principal-line dependent index extraction unit configured to extract, from the image, directional features corresponding to directions different from each other and to generate a principal-line dependent index, which represents a degree of dependence of a principal line on the basis of the directional features; and a principal-line dependent index matching process unit configured to obtain a seventh degree of similarity between the principal-line dependent index and a registered principal-line dependent index stored in the storage unit, wherein the determination unit conducts weighting in such a manner that the higher the seventh degree of similarity is, the smaller the weight corresponding to the seventh degree of similarity is, and determines whether or not a subject is a person to be authenticated, by using the seventh degree of similarity; and wherein the operations of the principal-line dependent index extraction unit and the principal-line dependent index matching process unit are performed by the computer.

10. The biometrics authentication device according to claim 1, wherein the non-directional feature generation process unit includes:

a filter configured to extract the plurality of directional features from the image;

a perpendicular filter configured to decrease a luminance value of an entire directional feature corresponding to the reference direction, to increase a luminance value of an entire directional feature corresponding to a direction perpendicular to the directional feature corresponding to the reference direction, and to output other directional features as they are, from among the plurality of directional features extracted from the filter; and a non-directional feature generation unit configured to generate the non-directional feature by using a plurality of directional features output from the perpendicular filter.

11. The biometrics authentication device according to claim 1, wherein the non-directional feature extraction process unit includes:

a filter configured to extract the plurality of directional features from the image;

a direction-by-direction directional feature normalization process unit configured to conduct normalization on the plurality of directional features extracted by the filter; and a non-directional feature generation unit configured to generate the non-directional feature by using a plurality of directional features output from the direction-by-direction directional feature normalization process unit.

12. The biometrics authentication device according to claim 1, comprising:

a score analysis unit configured to select the second degree of similarity corresponding to the reference direction from among a plurality of degrees of similarity obtained by the directional feature matching process unit, wherein the determination unit makes a weight of the second degree of similarity smaller; and wherein operation of the score analysis unit is performed by the computer.

13. The biometrics authentication device according to claim 1, comprising:

a noise removal process unit configured to conduct noise removal on the image, wherein the non-directional feature extraction process unit extracts, from an image output from the noise removal process unit, directional features corresponding to directions different from each other and generates the non-directional feature on the basis of the directional features, and the directional feature extraction process unit extracts, from an image output from the noise removal process unit, directional features corresponding to directions different from each other and selects, from among the directional features, the reference directional feature corresponding to the reference direction, and wherein operation of the noise removal process unit is performed by the computer.

14. The biometrics authentication device according to claim 1, comprising:

a luminance normalization process unit configured to conduct luminance normalization on the image, wherein the non-directional feature extraction process unit extracts, from an image output from the luminance normalization process unit, directional features corresponding to directions different from each other and generates the non-directional feature on the basis of the directional features, and the directional feature extraction process unit extracts, from an image output from the luminance normalization process unit, directional features corresponding to directions different from each other and selects, from among the directional features, the reference directional feature corresponding to the reference direction, and wherein operation of the luminance normalization process unit is performed by the computer.

15. The biometrics authentication device according to claim 1, comprising:

a geometric normalization process unit configured to conduct geometric normalization on the image, wherein the non-directional feature extraction process unit extracts, from an image output from the geometric normalization process unit, directional features corresponding to directions different from each other and generates the non-directional feature on the basis of the directional features, and the directional feature extraction process unit extracts, from an image output from the geometric normalization process unit, directional features corresponding to directions different from each other and selects, from among the directional features, the reference directional feature corresponding to the reference direction, and wherein operation of the geometric normalization process unit is performed by the computer.

16. A biometrics authentication method causing a computer to execute a process comprising:

extracting, from an input image, directional features corresponding to directions different from each other and generating a non-directional feature on the basis of the directional features;

extracting, from the input image, directional features corresponding to directions different from each other and selecting, from among the directional features, a reference directional feature corresponding to a reference direction;

obtaining a first degree of similarity between the non-directional feature and a registered non-directional feature stored in a storage unit;

obtaining a second degree of similarity between the reference directional feature and a registered reference directional feature stored in the storage unit; and making a weight of the second degree of similarity smaller than a weight of the first degree of similarity and determining whether or not a subject is a person to be authenticated, by using the first degree of similarity and the second degree of similarity.

17. A non-transitory computer-readable recording medium which records a program causing a computer to execute a process comprising:

extracting, from an input image, directional features corresponding to directions different from each other and generating a non-directional feature on the basis of the directional features;

extracting, from the input image, directional features corresponding to directions different from each other and selecting, from among the directional features, a reference directional feature corresponding to a reference direction;

obtaining a first degree of similarity between the non-directional feature and a registered non-directional feature stored in a storage unit;

obtaining a second degree of similarity between the reference directional feature and a registered reference directional feature stored in the storage unit; and making a weight of the second degree of similarity smaller than a weight of the first degree of similarity and determining whether or not a subject is a person to be authenticated, by using the first degree of similarity and the second degree of similarity.

* * * * *